United States Patent
Meng et al.

(10) Patent No.: US 10,069,328 B2
(45) Date of Patent: Sep. 4, 2018

(54) INTELLIGENT MULTI-MODE WIRELESS POWER SYSTEM

(71) Applicant: POWERSPHYR INC., Danville, CA (US)

(72) Inventors: David F. Meng, San Ramon, CA (US); William B. Wright, Boca Raton, FL (US)

(73) Assignee: POWERSPHYR INC., Danville, CA (US)

( * ) Notice: Subject to any disclaimer, the term of this patent is extended or adjusted under 35 U.S.C. 154(b) by 0 days.

(21) Appl. No.: 15/480,183

(22) Filed: Apr. 5, 2017

(65) Prior Publication Data
US 2017/0294797 A1  Oct. 12, 2017

Related U.S. Application Data

(63) Continuation-in-part of application No. 15/092,531, filed on Apr. 6, 2016.

(51) Int. Cl.
H02J 7/00 (2006.01)
H01F 27/42 (2006.01)
(Continued)

(52) U.S. Cl.
CPC .............. *H02J 7/025* (2013.01); *H02J 50/12* (2016.02); *H02J 50/80* (2016.02)

(58) Field of Classification Search
CPC .................................................... H02J 7/025
(Continued)

(56) References Cited

U.S. PATENT DOCUMENTS 6,289,237 B1  9/2001  Mickle et al.
6,615,074 B2  9/2003  Mickle et al.
(Continued)

FOREIGN PATENT DOCUMENTS

EP  2387127 A2  11/2011
EP  2579424 A2  4/2013
(Continued)

OTHER PUBLICATIONS

International Search Report & Written Opinion for PCT Application PCT/US2017/026186 dated Jul. 14, 2017, 17 pages.
(Continued)

*Primary Examiner* — Richard V Muralidar
(74) *Attorney, Agent, or Firm* — Fountainhead Law Group P.C.

(57) ABSTRACT

A method is provided that includes identifying, by a power transferring unit, a power receiving unit in a proximity of the power transferring unit. The method further includes determining whether the power receiving unit is in a near field range or in a far range of the power transferring unit, receiving a power status from the power receiving unit and generating, in the power transferring unit and based on the power status information, a directed energy signal from a power transferring unit to the power receiving unit when the power receiving unit is within a far range of the power transmitting unit. The method includes generating, in the power transferring unit and based on the power status, an inductively coupled field that is resonant with the power receiving unit, when the power receiving unit is within at least a near field range of the power transferring unit.

19 Claims, 18 Drawing Sheets

(51) Int. Cl.
*H02J 7/02* (2016.01)
*H02J 50/12* (2016.01)
*H02J 50/80* (2016.01)

(58) Field of Classification Search
USPC .......................................... 320/108; 307/104
See application file for complete search history.

(56) References Cited

U.S. PATENT DOCUMENTS

| | | | |
|---|---|---|---|
| 6,856,291 B2 | 2/2005 | Mickle et al. | |
| 6,886,685 B2 * | 5/2005 | Slater .................... | B42D 5/005 206/215 |
| 7,027,311 B2 | 4/2006 | Vanderelli et al. | |
| 7,057,514 B2 | 6/2006 | Mickle et al. | |
| 7,639,994 B2 | 12/2009 | Greene et al. | |
| 7,643,312 B2 | 1/2010 | Vanderelli et al. | |
| 7,741,734 B2 | 6/2010 | Joannopoulos et al. | |
| 7,812,771 B2 | 10/2010 | Greene et al. | |
| 7,825,543 B2 | 11/2010 | Karalis et al. | |
| 7,844,306 B2 | 11/2010 | Shearer et al. | |
| 7,868,482 B2 | 1/2011 | Greene et al. | |
| 7,898,105 B2 | 3/2011 | Greene et al. | |
| D636,333 S | 4/2011 | Kulikowski | |
| 7,925,308 B2 | 4/2011 | Greene et al. | |
| 8,022,576 B2 | 9/2011 | Joannopoulos et al. | |
| 8,035,255 B2 | 10/2011 | Kurs et al. | |
| 8,076,800 B2 | 12/2011 | Joannopoulos et al. | |
| 8,076,801 B2 | 12/2011 | Karalis et al. | |
| 8,084,889 B2 | 12/2011 | Joannopoulos et al. | |
| 8,097,983 B2 | 1/2012 | Karalis et al. | |
| 8,115,448 B2 | 2/2012 | John | |
| 8,159,090 B2 | 4/2012 | Greene et al. | |
| 8,159,364 B2 | 4/2012 | Zeine | |
| 8,304,935 B2 | 11/2012 | Karalis et al. | |
| 8,324,759 B2 | 12/2012 | Karalis et al. | |
| 8,362,651 B2 | 1/2013 | Hamam et al. | |
| 8,378,522 B2 | 2/2013 | Cook et al. | |
| 8,395,282 B2 | 3/2013 | Joannopoulos et al. | |
| 8,395,283 B2 | 3/2013 | Joannopoulos et al. | |
| 8,400,017 B2 | 3/2013 | Kurs et al. | |
| 8,400,018 B2 | 3/2013 | Joannopoulos et al. | |
| 8,400,019 B2 | 3/2013 | Joannopoulos et al. | |
| 8,400,020 B2 | 3/2013 | Joannopoulos et al. | |
| 8,400,021 B2 | 3/2013 | Joannopoulos et al. | |
| 8,400,022 B2 | 3/2013 | Joannopoulos et al. | |
| 8,400,023 B2 | 3/2013 | Joannopoulos et al. | |
| 8,400,024 B2 | 3/2013 | Joannopoulos et al. | |
| 8,410,636 B2 | 4/2013 | Kurs et al. | |
| 8,410,953 B2 | 4/2013 | Zeine | |
| 8,432,062 B2 | 4/2013 | Greene et al. | |
| 8,441,154 B2 | 5/2013 | Karalis et al. | |
| 8,446,248 B2 | 5/2013 | Zeine | |
| 8,461,719 B2 | 6/2013 | Kesler et al. | |
| 8,461,720 B2 | 6/2013 | Kurs et al. | |
| 8,461,721 B2 | 6/2013 | Karalis et al. | |
| 8,461,722 B2 | 6/2013 | Kurs et al. | |
| 8,461,817 B2 | 6/2013 | Martin et al. | |
| 8,466,583 B2 | 6/2013 | Karalis et al. | |
| 8,471,410 B2 | 6/2013 | Karalis et al. | |
| 8,476,788 B2 | 7/2013 | Karalis et al. | |
| 8,482,158 B2 | 7/2013 | Kurs et al. | |
| 8,487,480 B1 | 7/2013 | Kesler et al. | |
| 8,497,601 B2 | 7/2013 | Hall et al. | |
| D692,010 S | 10/2013 | Verghese | |
| 8,552,592 B2 | 10/2013 | Schatz et al. | |
| 8,558,661 B2 | 10/2013 | Zeine | |
| 8,587,153 B2 | 11/2013 | Schatz et al. | |
| 8,587,155 B2 | 11/2013 | Giler et al. | |
| 8,598,743 B2 | 12/2013 | Hall et al. | |
| 8,618,696 B2 | 12/2013 | Kurs et al. | |
| 8,621,245 B2 | 12/2013 | Shearer et al. | |
| D697,477 S | 1/2014 | Jonas, III | |
| 8,629,578 B2 | 1/2014 | Kurs et al. | |
| 8,643,326 B2 | 2/2014 | Campanella et al. | |
| 8,667,452 B2 | 3/2014 | Verghese et al. | |
| 8,669,676 B2 | 3/2014 | Karalis et al. | |
| 8,686,598 B2 | 4/2014 | Schatz et al. | |
| 8,692,410 B2 | 4/2014 | Schatz et al. | |
| 8,692,412 B2 | 4/2014 | Fiorello et al. | |
| D705,745 S | 5/2014 | Kurs et al. | |
| 8,716,903 B2 | 5/2014 | Kurs et al. | |
| 8,723,366 B2 | 5/2014 | Fiorello et al. | |
| 8,729,737 B2 | 5/2014 | Schatz et al. | |
| 8,760,007 B2 | 6/2014 | Joannopoulos et al. | |
| 8,760,008 B2 | 6/2014 | Joannopoulos et al. | |
| D709,855 S | 7/2014 | Jonas | |
| 8,766,485 B2 | 7/2014 | Joannopoulos et al. | |
| 8,772,971 B2 | 7/2014 | Joannopoulos et al. | |
| 8,772,972 B2 | 7/2014 | Joannopoulos et al. | |
| 8,772,973 B2 | 7/2014 | Kurs | |
| 8,791,599 B2 | 7/2014 | Joannopoulos et al. | |
| 8,805,530 B2 | 8/2014 | John | |
| 8,836,172 B2 | 9/2014 | Hamam et al. | |
| 8,847,548 B2 | 9/2014 | Kesler et al. | |
| 8,854,176 B2 | 10/2014 | Zeine | |
| 8,875,086 B2 | 10/2014 | Verghese et al. | |
| 8,901,778 B2 | 12/2014 | Kesler et al. | |
| 8,901,779 B2 | 12/2014 | Kesler et al. | |
| 8,907,531 B2 | 12/2014 | Hall et al. | |
| 8,928,276 B2 | 1/2015 | Kesler et al. | |
| 8,937,408 B2 | 1/2015 | Ganem et al. | |
| D722,048 S | 2/2015 | Kurs et al. | |
| 8,963,488 B2 | 2/2015 | Campanella et al. | |
| 9,000,616 B2 | 4/2015 | Greene et al. | |
| 9,021,277 B2 | 4/2015 | Shearer et al. | |
| 9,142,973 B2 | 9/2015 | Zeine | |
| 9,143,000 B2 | 9/2015 | Leabman et al. | |
| 9,240,824 B2 | 1/2016 | Hillan et al. | |
| 9,608,472 B2 * | 3/2017 | Moshfeghi .............. | H02J 50/20 |
| 2004/0150934 A1 | 8/2004 | Baarman | |
| 2005/0206577 A1 | 9/2005 | Lee | |
| 2008/0054638 A1 | 3/2008 | Greene et al. | |
| 2010/0127660 A1 | 5/2010 | Cook et al. | |
| 2010/0190436 A1 | 7/2010 | Cook et al. | |
| 2010/0244576 A1 | 9/2010 | Hillan et al. | |
| 2012/0062358 A1 | 3/2012 | Nowottnick | |
| 2013/0026981 A1 * | 1/2013 | Van Der Lee .......... | H02J 5/005 320/108 |
| 2013/0221915 A1 | 8/2013 | Son et al. | |
| 2014/0327323 A1 | 11/2014 | Masaoka et al. | |
| 2015/0011160 A1 | 1/2015 | Jurgovan et al. | |
| 2016/0020637 A1 | 1/2016 | Khlat | |
| 2016/0285489 A1 | 9/2016 | Gong et al. | |
| 2016/0301257 A1 | 10/2016 | Parks et al. | |

FOREIGN PATENT DOCUMENTS

| | | |
|---|---|---|
| EP | 2755300 A1 | 7/2014 |
| WO | 2015064815 A1 | 5/2015 |
| WO | 2016164321 A1 | 10/2016 |

OTHER PUBLICATIONS

Jorgesen et al.: "Balun Basics Primer: A Tutorial On Baluns, Balun Transformers, Magic-Ts, and 180 degree Hybrids", Marki Microwave, Inc., 2014, 12 pages.

International Search Report & Written Opinion for PCT Application PCT/US2017/057015 dated Jan. 18, 2018, 23 pages.

* cited by examiner

INTELLIGENT MULTI-MODE WIRELESS POWER SYSTEM

CROSS-REFERENCE TO RELATED APPLICATIONS

The present application claims priority, as a continuation in part to, U.S. patent application Ser. No. 15/092,531, entitled INTELLIGENT MULTI-MODE WIRELESS POWER SYSTEM, to David F. Meng and William B. Wright. filed on Apr. 6, 2016, the contents of which are hereby incorporated by reference in their entirety, for all purposes.

BACKGROUND OF THE DISCLOSURE

Field of the Disclosure

The present disclosure relates to providing wireless power to electric or electronic devices and more particularly to improving the wireless transfer of power to devices for charging and/or sustaining power to those device loads.

Description of the Related Art

Common electric or electronic devices consume significant levels of electric power with use and a considerable amount of usage occurs while away from main alternate current (AC) power sources traditionally used to supply power to such devices. Due to battery storage limitations, the need for frequent recharging exists in order to sustain device operation. Furthermore, the prevalence of portable electronic devices and devices operating in areas where immediate physical connection with a traditional power source is unavailable, has resulted in increased complexity for management and maintenance of connected electrical power adapters and traditional power sources dependent on power conducting cables.

Current solutions to this problem are based on a singular type of wireless power transfer typically involving restrictions on use and distance that result in either higher power at short distances or lower power at greater distances. There is a lack of intelligent systems that provide a comprehensive multi-mode wireless power delivery solution without said limitations.

SUMMARY

In a first embodiment, a method is provided that includes identifying, by a power transferring unit, a power receiving unit in a proximity of the power transferring unit. The method further includes determining whether the power receiving unit is in a near field range or in a far range of the power transferring unit, receiving a power status from the power receiving unit and generating, in the power transferring unit and based on the power status, a directed energy signal from a power transferring unit to the power receiving unit when the power receiving unit is within a far range of the power transferring unit. The method includes generating, in the power transferring unit and based on the power status, an inductively coupled field that is resonant with the power receiving unit, when the power receiving unit is within at least a near field range of the power transferring unit.

In a second embodiment, a device is provided that includes a memory configured to store instructions and a processor configured to execute the instructions. When the processor executes the instructions it causes the device to perform steps to identify a power transferring unit in a proximity of the device, determine whether the device is in a near field range or in a far range of the power transferring unit and transmit a power status of the device to the power transferring unit. The processor also executes instructions to cause the device to receive, based on the power status of the device, a directed energy signal from the power transferring unit when the device is within a far range of the power transmitting unit and receive, based on the power status, an inductively coupled field that is resonant with the power receiving unit, when the power receiving unit is within at least a near field range of the power transferring unit.

In a third embodiment, a method is provided that includes identifying, by a power receiving unit, a power transferring unit in a proximity of the power receiving unit. The method also includes determining whether the power receiving unit is in a near field range or in a far range of the power transferring unit, transmitting a power status to the power transferring unit and receiving, in the power receiving unit and based on the power status, a directed energy signal from the power transferring unit to the power receiving unit when the power receiving unit is within a far range of the power transferring unit. The method also includes receiving, in the power receiving unit and based on the power status, an inductively coupled field that is resonant with the power receiving unit, when the power receiving unit is within at least a near field range of the power transferring unit.

In yet another embodiment, a device is provided that includes a means to store instructions and a means to execute the instructions. When the means to execute the instructions executes the instructions, it causes the device to perform steps to identify a power transferring unit in a proximity of the device, determine whether the device is in a near field range or in a far range of the power transferring unit and transmit a power status of the device to the power transferring unit. The means to execute instructions also executes instructions to cause the device to receive, based on the power status of the device, a directed energy signal from the power transferring unit when the device is within a far range of the power transferring unit and receive, based on the power status, an inductively coupled field that is resonant with the power receiving unit, when the power receiving unit is within at least a near field range of the power transferring unit.

DETAILED DESCRIPTION OF THE DISCLOSURE

Figure 1A:
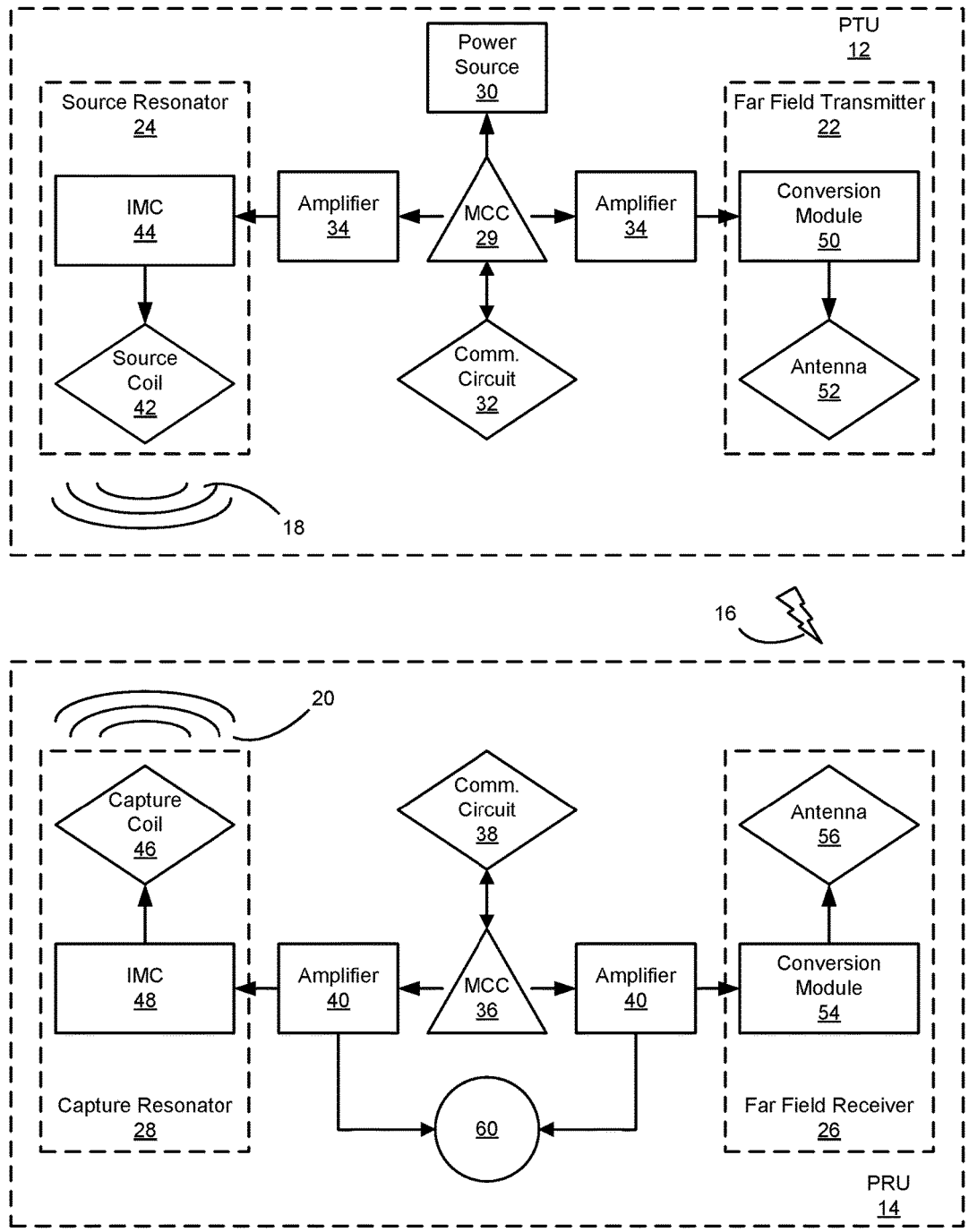
FIG. 1A is a schematic illustration of a system for providing intelligent wireless power to a device load, including a power transfer unit (PTU) and a power receiving unit (PRU), according to some embodiments.

In autonomous, mobile electronic appliances, power management is an issue that has direct impact in the performance and market advantage for the device. Thus, in many applications it is desirable to have extra mobility and autonomy for users as provided by embodiments disclosed herein. For example, in the area of medical devices such as implanted pacemakers and the like, having autonomy from battery recharge is desired as much as technologically feasible. Indeed, battery replacement in such configurations may involve complicated medical, or even surgical procedures. To the extent that these procedures can be avoided, or made more infrequent, embodiments as disclosed herein provide an extended power lifetime of the battery of such devices.

In the field of automotive applications, some embodiments as disclosed herein provide a central power transmitting unit that can wirelessly access multiple mobile devices (e.g., cell phones, laptops, notepads, and the like) within the enclosure of a car by maximizing the charge points throughout the vehicle. Accordingly, in embodiments as disclosed herein a driver can focus on the road rather than in looking for a plug to connect a power cord for a device, thereby enhancing road safety and the convenience of multiple charging points.

In one aspect, the present disclosure is embodied as a system and method of providing wireless power intelligently to a device load. Accordingly, embodiments consistent with the present disclosure transmit a directed power signal wirelessly from a power transferring unit (PTU) to a power receiving unit (PRU) in a first mode of operation (e.g., when the PRU is in the proximity of a far field range of the PTU).

In other aspects, embodiments as disclosed herein include generating a field (e.g., a resonant magnetic field) wirelessly and inductively coupled to the PRU at a resonant frequency of a receiver circuit in a second mode of operation (e.g., when the PRU is in the proximity of a near field range of the PTU). Accordingly, in embodiments consistent with the present disclosure, a power transfer from the PTU to the PRU is managed selectively and efficiently. Embodiments as disclosed herein deliver power as desired in the first mode of operation, the second mode of operation, or a combination of both modes simultaneously. Furthermore, embodiments as disclosed herein take into consideration a power requirement of the PRU, and its range relative to the PTU. In some embodiments, a PTU may transfer power to a plurality of PRU's, sorted according to a prioritization that takes into account the power requirements and range of each PRU relative to the PTU.

In one embodiment, the PTU includes a far field transmitter configured to wirelessly transmit a directed power signal. The PTU also includes a source resonator configured to generate a resonant magnetic field for inductively coupling power to the PRU in the near field range. The PRU includes a far field receiver configured to wirelessly receive the directed power signal transmitted from the far field transmitter. The PRU may also include a capture resonator configured to inductively capture resonant magnetic power in the near field generated by the source resonator.

Some embodiments include a method of managing multimode transfer of wireless power. The method includes optimizing the wireless transfer of power from the PTU in at least the first mode of operation, the second mode of operation, or the two modes of operation simultaneously. The method includes capturing and receiving the optimized power transferred wirelessly over varying distances by one or more power receiving units (PRU's). Some embodiments include an MCC configured to dynamically update a status of a range configuration between the PRU and the PTU to maximize the amount of power transferred between the devices in a dual mode, when available. Furthermore, some embodiments include a power harvesting configuration that exploits the large amount of unused digital data propagating at RF frequencies wirelessly to convert the digital signals into power transferred to the PRU. In such configuration, the MCC includes the reception and availability of the digital signals for harvesting. Moreover, in some embodiments the MCC is further configured to prioritize the desire for power for one or more PRU's in close proximity of the PTU. Thus, the load on the PTU is optimized for the needs of the one or multiple PRU's benefiting from the power transfer.

The present disclosure addresses the shortcomings of existing single-mode wireless power delivery systems such as low power transfer from a far field source or the limited spatial freedom of near field power transfer inherent to these technologies. At the same time, embodiments consistent with the present disclosure obviate a need for traditional wired or cabled power delivery methods. Advantages of the present disclosure include increased efficiency, added redundancy for applications where critical loss of available power could be detrimental to the user and optional spatial versatility when lower power transfer rates are acceptable while providing power to or charging an electric or electronic device.

FIG. 1A illustrates a system for providing intelligent wireless power to a device load in accordance with the principles of the present disclosure, designated generally as 10. The system 10 includes PTU 12 and PRU 14. PTU 12 is configured to transmit a directed power signal 16 wirelessly in a first mode of operation to PRU 14. In some embodiments, PTU 12 is further configured to generate an inductively coupled field (e.g., a resonant magnetic field) 18 wirelessly in a second mode of operation. PRU 14 is configured to receive the directed power signal 16 from PTU 12 when PRU 14 is in the far field range of PTU 12. Further, PRU 14 is also configured to inductively couple a magnetic field 20 thereof to the resonant magnetic field 18 in the second mode when PRU 14 is in the proximity of a near field range of PTU 12, as will be explained in detail below.

PTU 12 includes a far field transmitter 22 configured to wirelessly transmit the directed power signal 16 and a source resonator 24 configured to generate the resonant magnetic field 18. PRU 14 includes a far field receiver 26 configured to wirelessly receive the directed power signal 16 transmitted from the far field transmitter 22, and a capture resonator 28 configured to capture resonant magnetic power 18 in the near field generated by the source resonator 24.

In one embodiment, PTU 12 includes a micro-controller circuit (MCC) 29 operatively connected to a power source 30 and configured to intelligently induce wireless transfer of power within the near field, far field or both as required, and to manage the distribution and priorities of power transfer. A communications circuit 32 is configured to establish communication between PTU 12 and PRU 14. A PTU amplifier/rectifier circuit 34 is configured to convert the power for the source resonator 24 and the far field transmitter 22.

In one embodiment, PRU 14 includes an MCC 36 configured to intelligently manage the power transfer in the near field mode, the far field mode, or both modes, as desired. A communications circuit 38 is configured to communicate information between PTU 12 and PRU 14. An amplifier/rectifier circuit 40 is configured to convert power from a capture resonator 28 and a far field receiver 26. MCC 36 may be integrated into one or more device loads to be charged or powered.

In one embodiment, source resonator 24 includes a source coil 42 operatively connected to an impedance matching circuit (IMC) 44. The capture resonator 28 includes a capture coil 46 operatively connected to IMC 48. A far field transmitter 22 includes a signal conversion module 50 and a far field transmitter antenna(s) 52 whereby the amplified/rectified power is converted by the signal conversion module 50 to a power signal suitable for transmission via a far field transmitter antenna(s) 52. A far field receiver 26 includes a signal conversion module 54 and a far field receiver antenna(s) 56.

The transmitters and resonators convert RF power to power signals at an ISM frequency band appropriately optimized for the application of the system and within accordance of regulatory rules and laws governing such wireless operations.

Figure 1B:
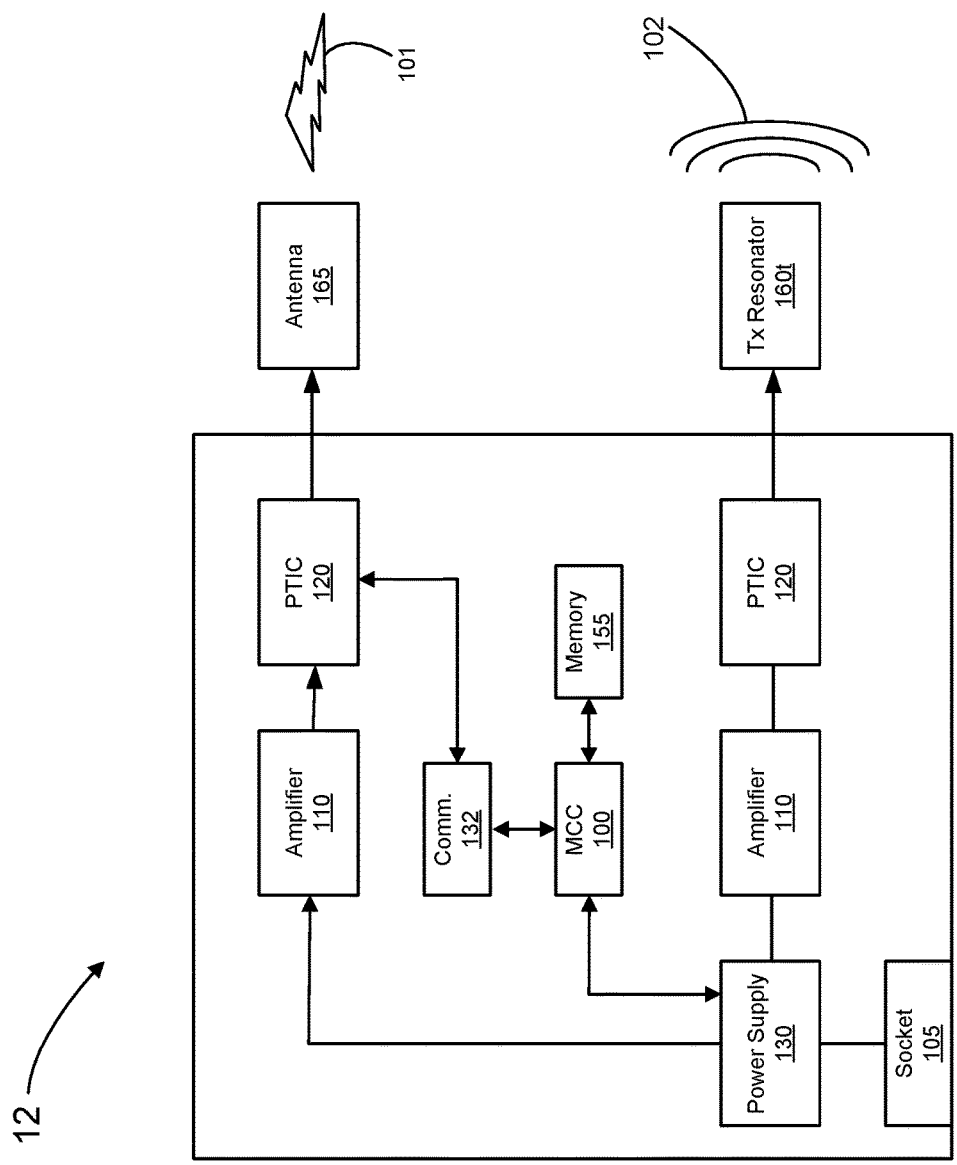
FIG. 1B is a schematic illustration of a PTU, according to some embodiments.

FIG. 1B is a schematic illustration of a PTU 12, according to some embodiments. In some embodiments, PTU 12 is configured to wirelessly transmit a directed power signal using an RF antenna 165 to PRU 14 located at least within a far field range from PTU 12, in a first mode of operation (e.g., "far range" mode). RF antenna 165 may be a far field transmitter configured to wirelessly transmit the directed power signal to PRU 14 located within the far range of PTU 12. The directed power signal may include an RF propagating signal suitably tuned to a resonant receiver circuit in PRU 14 (e.g., at 915 MHz). Moreover, in some embodiments the directed power signal may also include a selected directionality for the RF propagating signal to make more efficient the power transfer between PTU 12 and the PRU 14.

In some embodiments, PTU 12 may also be configured to generate an inductively coupled field with a Tx resonator 160$t$, which is resonant with a receiver circuit in PRU 14. An inductively coupled field may include an RF modulated magnetic field wirelessly transmitted across a near range in a second mode of operation of PTU 12 (e.g., "near field" mode). In some embodiments, Tx resonator 160$t$ is configured to generate a magnetic induction field 102 modulated at approximately 6.78 MHz. In some embodiments, and without limitation, the magnetic field may be modulated at a lower frequency, e.g., 1 MHz, 100's of kHz, or even lower frequencies, depending on range, power, and other design configurations.

PTU 12 further includes a micro-controller circuit (MCC) 100 operatively coupled to a memory circuit 155 and configured to cause PTU 12 to perform a wireless transfer of power in the near field mode of operation, the far field mode of operation or both as required. In some embodiments, MCC 100 may be as MCC 29 or MCC 36, described in detail above. Further, in some embodiments MCC 100 is configured to manage the distribution and priorities of a power transfer between PTU 12 and multiple PRUs 14. Accordingly, in some embodiments PTU 12 includes a communications circuit 132 (e.g., communications circuit 32) configured to communicate information between PTU 12 and PRU 14. The RF power signal is provided by an RF power supply 130 to amplifier 110. In some embodiments, RF power supply 130 is controlled by MCC 100.

Amplifier 110 and passively tuning IC (PTIC) 120 are configured to provide an amplified RF signal to RF antenna 165, the amplified RF signal tuned to a frequency that is resonant with a receiver circuit in PRU 14 (e.g., receiver 56). Further, in some embodiments, PTIC 120 includes a coil operatively coupled with an impedance matching circuit (IMC).

In some embodiments, PTU 12 may be wired to an external power supply (e.g., a computer, a centralized service station, a wall power, and the like) and configured to receive power resources. Accordingly a USB-Socket 105 may couple PTU 12 with the external power supply.

Figure 1C:
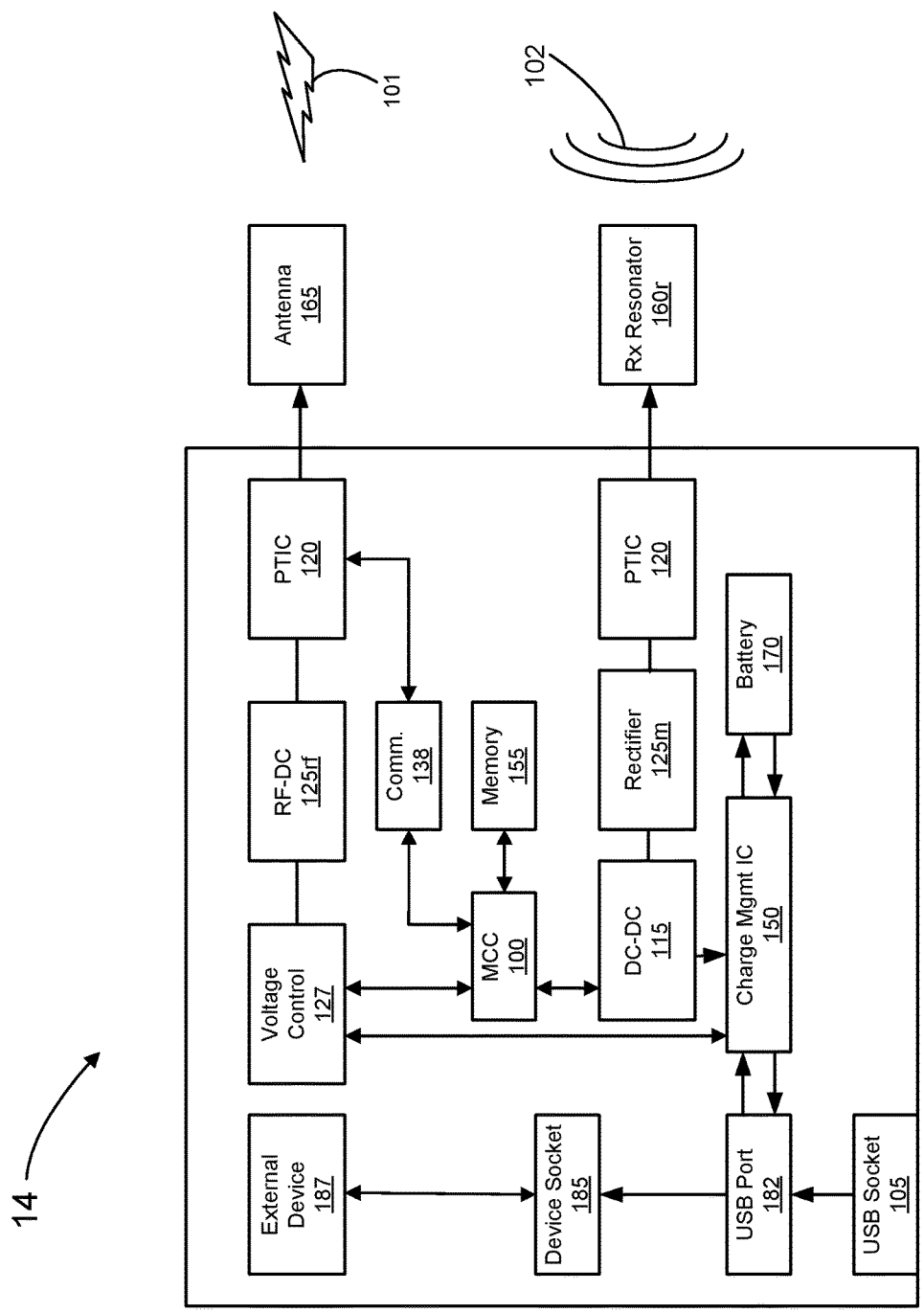
FIG. 1C is a schematic illustration of a PRU, according to some embodiments.

FIG. 1C is a schematic illustration of PRU 14, according to some embodiments. PTU 12 may include a communications circuit 138 (e.g., communications circuit 38) configured to communicate information between PTU 12 and PRU 14. PRU 14 includes an Rx resonator 160$r$ configured to receive an inductively coupled field from PTU 12. In some embodiments, the inductively coupled field is a magnetic field modulated at a low RF (e.g., 6.78 MHz, and the like) compared to the operation frequency of RF antenna 165 (e.g., 915 MHz). The RF of the magnetic field tuned to a resonant frequency of Rx resonator 160$r$. Further, in some embodiments, the resonant frequency of Rx resonator 160$r$ is tuned to the frequency of the RF modulated magnetic field by a PTIC 120, described in detail above with regard to PTU 12. Accordingly, in some embodiments, PTIC 120 may include a source coil operatively connected to an impedance matching circuit (IMC). Rx resonator 160$r$ initiates a power transfer from PTU 12 when PRU 14 is located within a near field range of PTU 12. Rectifier 125$m$ is configured to convert the inductively coupled field (e.g., a low RF modulated magnetic field) into a DC power signal including a voltage and a current. DC to DC converter 115 amplifies the DC power signal from rectifier 125$m$ and provides an inductive power signal to charge management IC 150. RF antenna 165 is configured to wirelessly receive a directed power signal transmitted from PTU 12. In some embodiments, RF antenna 165 is a far field receiver configured to wirelessly receive the directed power signal transmitted from the far field transmitter. An RF to DC circuit 125*rf* converts the directed power signal from an RF oscillating signal into a DC signal having a received voltage and a selected current. Voltage control 127 adjusts the received voltage to a pre-selected value and provides a directed power signal to charge management IC 150.

In some embodiments, charge management IC 150 includes a USB controller configured to handle a USB-type coupling with external devices (e.g., a device 187, USB to USB port 182, and USB socket 105). Charge management IC 150 provides a power signal to battery 170, at a selected DC voltage and a selected DC current. Accordingly, charge management IC 150 combines the directed power signal from voltage control 127 and the inductive power signal to provide a power signal that charges battery 170. Furthermore, in some embodiments, charge management IC 150 may select only one or the other of the directed power signal or the inductive power signal, depending on their availability and the mode of operation of PRU14, to provide the power signal to reserve battery 170.

In some embodiments, PRU 14 is integrated into device 187 through a device socket 185. Device 187 may be any type of mobile electronic appliance such as a computer, a laptop computer, a mobile phone, smart phone, tablet computer, and tablet phone. Furthermore, in some embodiments device 187 is capable of facilitating and running a software program for the purpose of displaying session data and offering additional command options for the power transfer session in a visual format. Moreover, in some embodiments battery 170 is a battery for device 187, integrally installed in device 187, or independently coupled to charge management IC 150.

In some embodiments, battery 170 is a reserve battery and may be charged via USB socket 105 and USB port 182 by a direct DC power source such as a laptop/computer, wall adaptor or power bank. Thus, device 187 may be charged at a later time from the charge in battery 170 (e.g., when PRU 14 is unplugged from a DC power source in USB socket 105). Accordingly, in some embodiments USB socket 105 and USB port 182 may be used for charging device 187 from the direct DC power source. In some embodiments, device 187 may be a phone externally coupled to USB socket 105 for charging, as a power bank. Thus, in some embodiments PRU 14 may charge an external device 187 via USB socket 105, and in some embodiments USB port 185 may receive a direct source of power coupled through USB socket 105 to charge reserve battery 170. Accordingly, embodiments consistent with the present disclosure provide device 187 with multiple options for charging.

PRU 14 includes MCC 100 and memory 155, which may be as described in detail above with regard to PTU 12. In some embodiments, MCC 100 is configured to control the receiving of the directed power signal at RF antenna 165 from PTU 12 when PRU 14 is in the proximity of a far field range of the PTU. Further, in some embodiments MCC 100 is configured to control the coupling of an inductive field wirelessly provided by PTU 12, to the resonate magnetic field in the second mode when PRU 14 is in the proximity of a near field coupling range of PTU 12. Accordingly, MCC 100 may be further configured to control charge management IC 150 wherein power is transferred to PRU 14 from PTU 12 by managing the directed power signal and the resonant magnetic field to deliver power as needed by the first mode of operation, the second mode of operation, or both modes of operation and with consideration to the power requirement of PRU 14, a priority value for transferring power to PRU 14, and a range configuration between PTU 12 and PRU 14. Accordingly, MCC 100 may be configured to manage and determine the power requirement of PRU 14 and the priority value for transferring power to PRU 14 in view of the range configuration between PTU 12 and PRU 14. Furthermore, in some embodiments the power requirement of PRU 14 may include a power requirement of device 187 docked in device socket 185. Memory 155 may include instructions to cause MCC 100, upon successfully establishing a communication link with PTU 12 via a communication protocol, and upon determining the presence of a corresponding software program installed on a device capable of running the software will provide relevant wireless power transfer session data in a visual format via said software program. In some embodiments, the second MCC is integrated into one or more of the IC components in device 187.

Figure 1D:
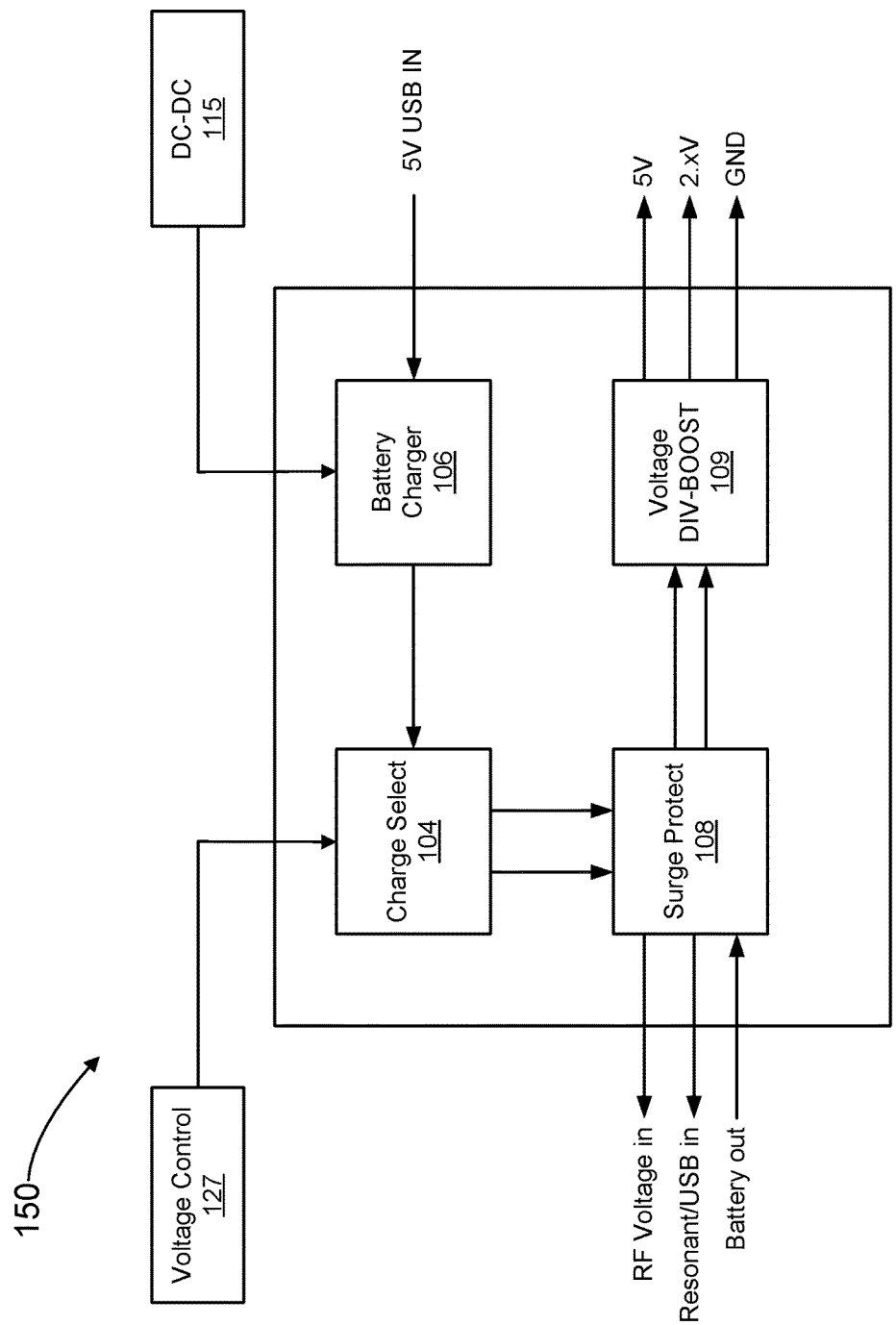
FIG. 1D is a schematic illustration of a charge management integrated circuit (IC), according to some embodiments.

FIG. 1D is a schematic illustration of charge management IC 150, configured to manage a power transfer from PRU 14 to battery 170, according to some embodiments. Battery 170 may be a part of PRU 14, or may be releasably coupled to PRU 14. Accordingly, battery 170 may in fact be part of device 187, and be communicatively coupled with PRU 14 through a USB port 182 and device socket 185. A charge select circuit 104 receives a directed power signal from PRU 14 (e.g., from RF voltage control 127). A battery charger circuit 106 receives a resonant inductive signal from PRU 14 (e.g., from DC to DC converter 115). In some embodiments, battery charger 106 may be powered by a USB signal (e.g., 5V from USB socket 105). Surge protect 108 provides the RF voltage as input to battery 170 and provides a resonant/USB input to battery 170. Surge protect 108 also receives an output from battery 170 and may include a switch to protect IC 100 from a power surge. Voltage divider boost 109 receives the power signal from battery 170 through surge protect circuit 108. Voltage divider boost 109 may provide multiple voltage outputs (e.g., at 5V, at 2.x V, and a ground voltage level: GND, nominally '0').

Figure 2A:
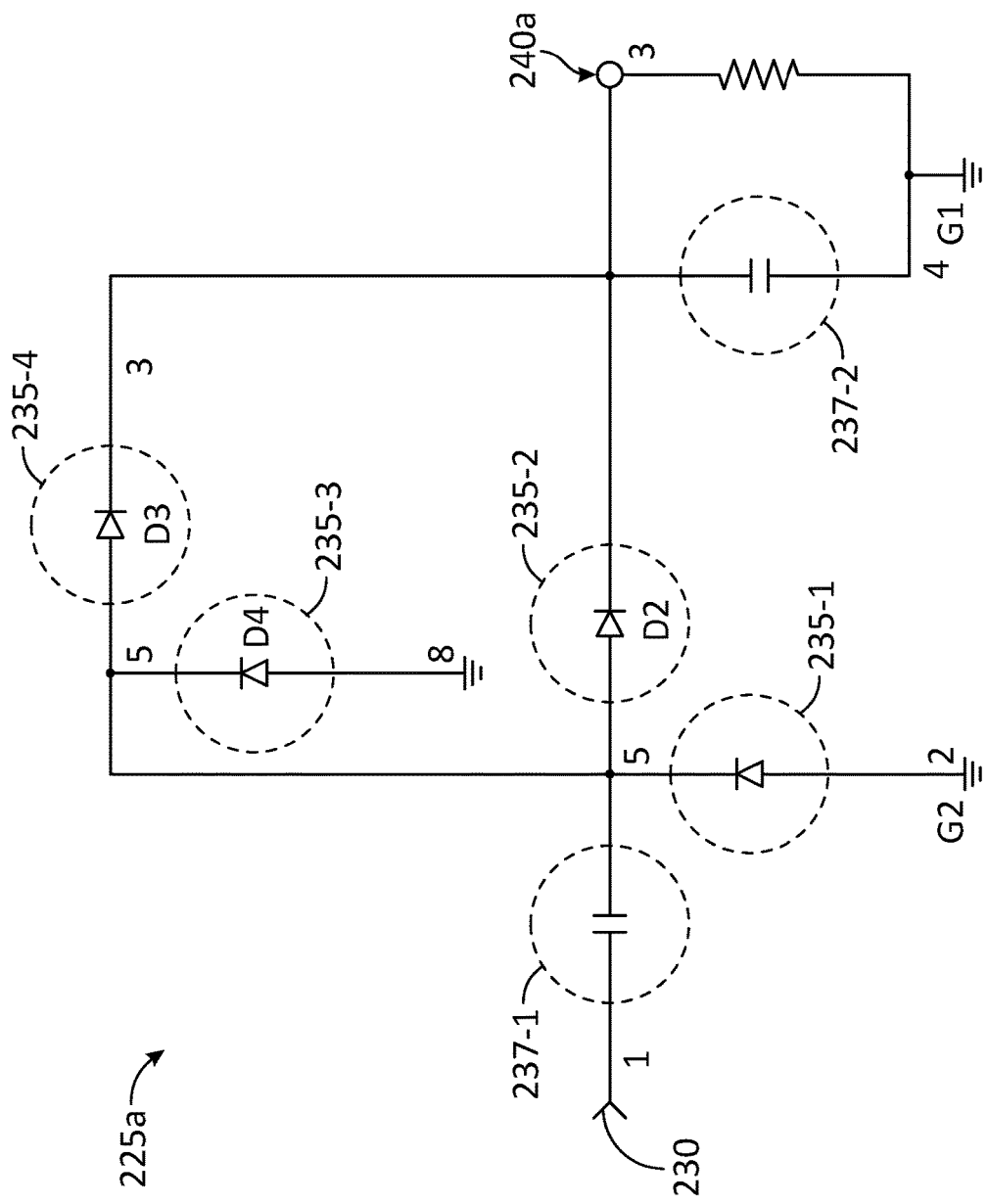
FIG. 2A is a schematic illustration of a radio-frequency (RF) to direct current (DC) conversion circuit, according to some embodiments.

FIG. 2A is a schematic illustration of a RF to DC conversion circuit 225*a*, according to some embodiments. RF to DC conversion circuit 225 *a* may be included in PRU 14 (e.g., RF to DC circuit 125*rf*). An input port 230 is coupled to an RF antenna through a PTIC circuit (e.g., RF antenna 165, PTIC circuit 120). Diodes 235-1, 235-2, 235-3, and 235-4 (hereinafter collectively referred to as "diodes 235") are arranged in a configuration such that an "upswing" is captured by a capacitor 237-1, and a "downswing" is captured by a capacitor 237-2 (hereinafter collectively referred to as "capacitors 237"). The charge of capacitors 237 is integrated in output port 240*a* as a DC signal.

Figure 2B:
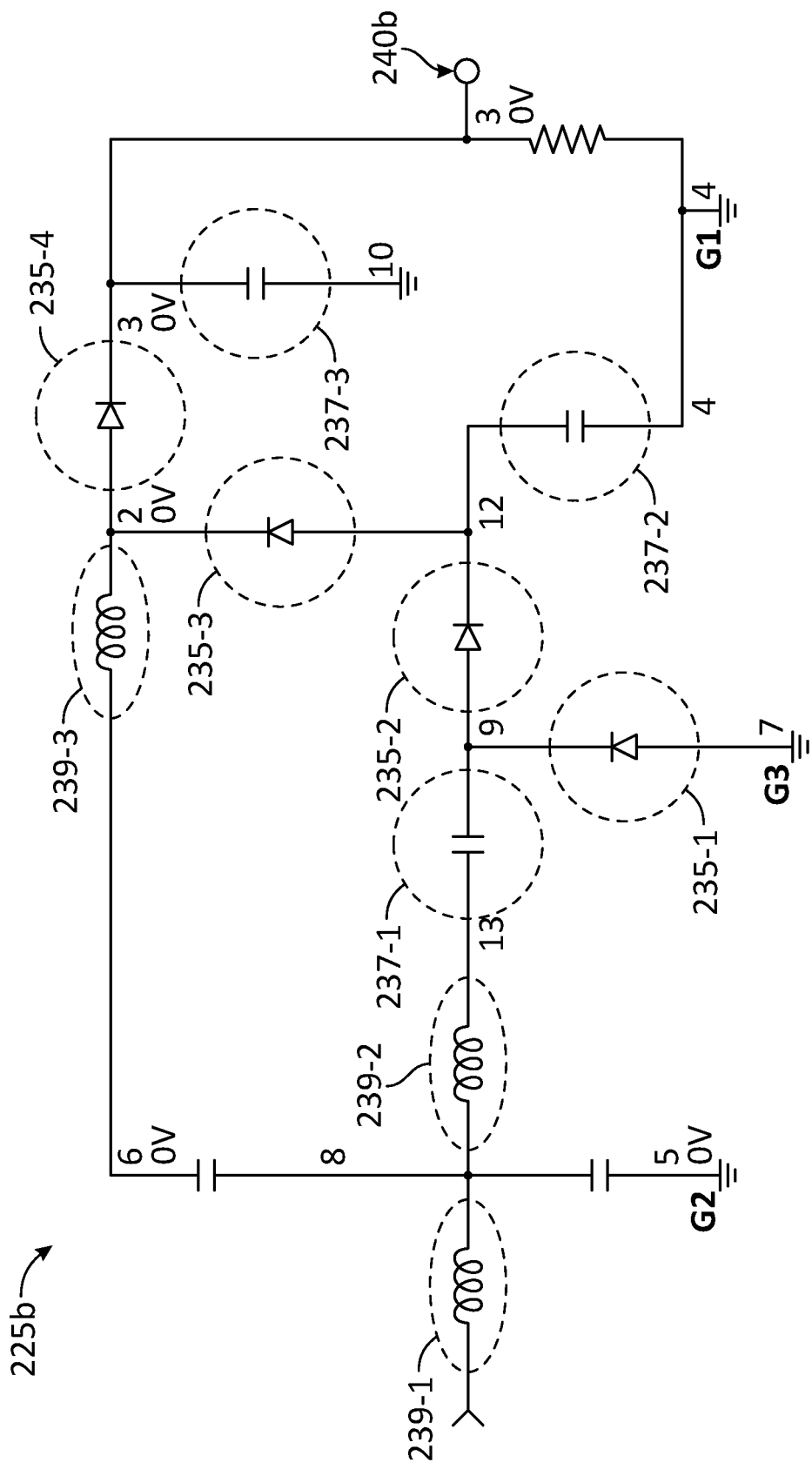
FIG. 2B is a schematic illustration of a RF to DC conversion circuit, according to some embodiments.

FIG. 2B is a schematic illustration of a radio-frequency (RF) to direct current (DC) conversion circuit 225*b*, according to some embodiments. Diodes 235 and capacitors 237 may be as described in detail above, regarding RF to DC conversion circuit 225*a*. In RF to DC conversion circuit 225*b*, inductors 239-1, 239-2, and 239-3 (hereinafter, collectively referred to as inductors 239) are configured to be resonantly tuned to an RF frequency of a directed energy signal (e.g., 915 MHz, and the like).

Figure 2C:
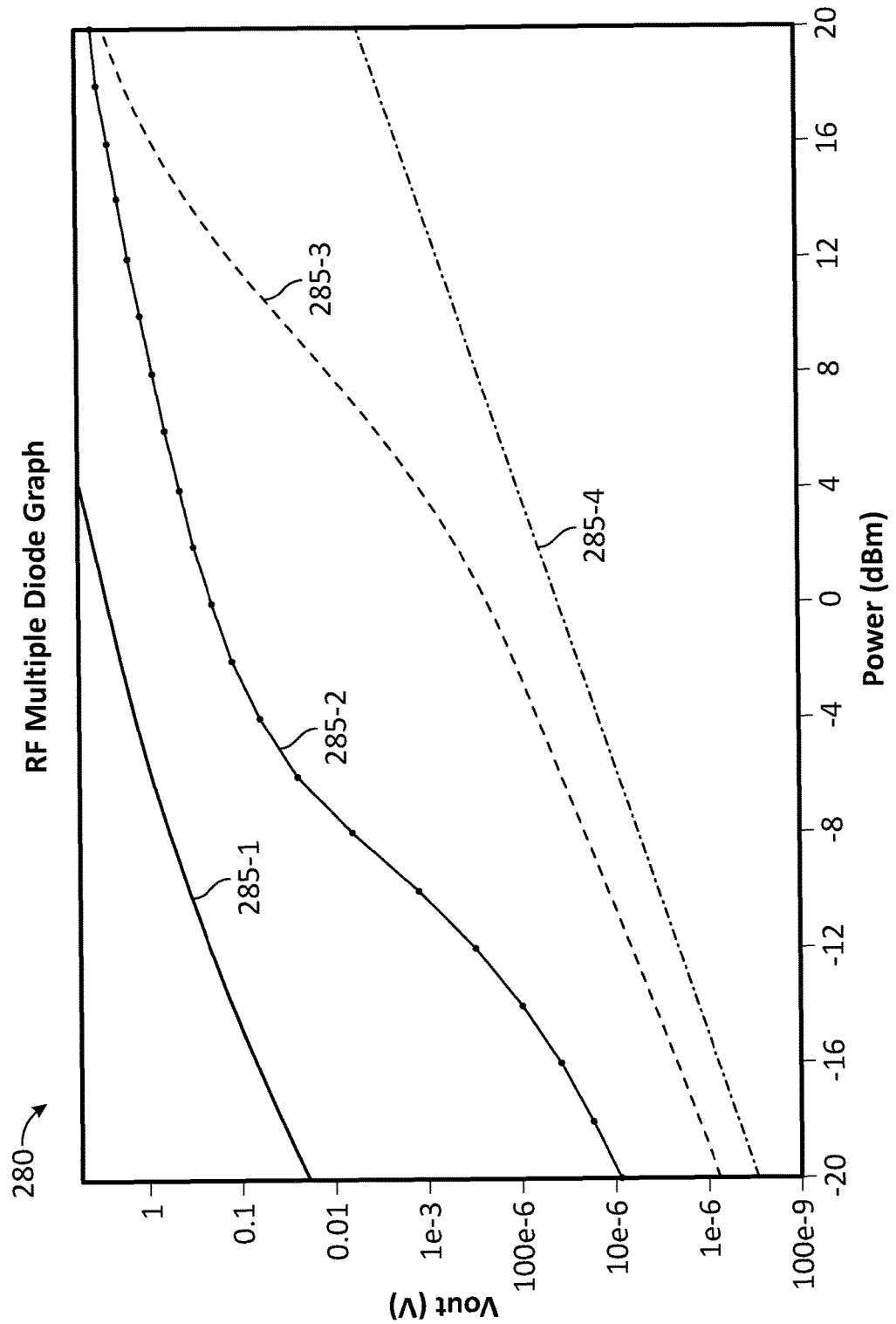
FIG. 2C is a chart illustrating voltage conversion versus input power in a first RF to DC conversion circuit, according to some embodiments.

FIG. 2C is a chart 280 illustrating DC voltage conversion versus input power in an RF to DC conversion circuit, according to some embodiments (e.g., RF to DC conversion circuits 225*a* and 225*b*). The abscissae (X-axis) in chart 280 represent the directed power (in dBm, where 1 dBm=1 milliWatt) at a given RF, and the ordinates (Y-axis) represent the output DC voltage (Volts). Curve 285-1, curve 285-2, curve 285-3, and curve 285-4 (hereinafter, collectively referred to as "curves 285") illustrate different voltage conversion efficiencies according to specific settings in the RF to DC conversion circuit. Curves 285 indicate that in a log-log plot (e.g., dBm is a logarithmic power scale), output DC voltage increases monotonically with input RF power. Without limitation, and for illustrative purposes only, curves 285 in FIG. 2C are obtained for an RF signal operating at 915 MHz.

Embodiments consistent with the present disclosure may use any one of curves 285 to select an RF value that produces a desired output DC voltage from the directed RF power. Accordingly, curves 285 may be stored in memory 155 and accessed by MCC 100 in PTU 12 or in PRU 14 to verify that the power requirements of PRU 14 or the device coupled to it are met as desired. Furthermore, curves 285 stored in memory 155 may be used by MCC 100 in PTU 12 or in PRU 14 to determine a power level for the directed energy at a desired RF frequency, based on the DC voltage requirements of battery 170.

Figure 2D:
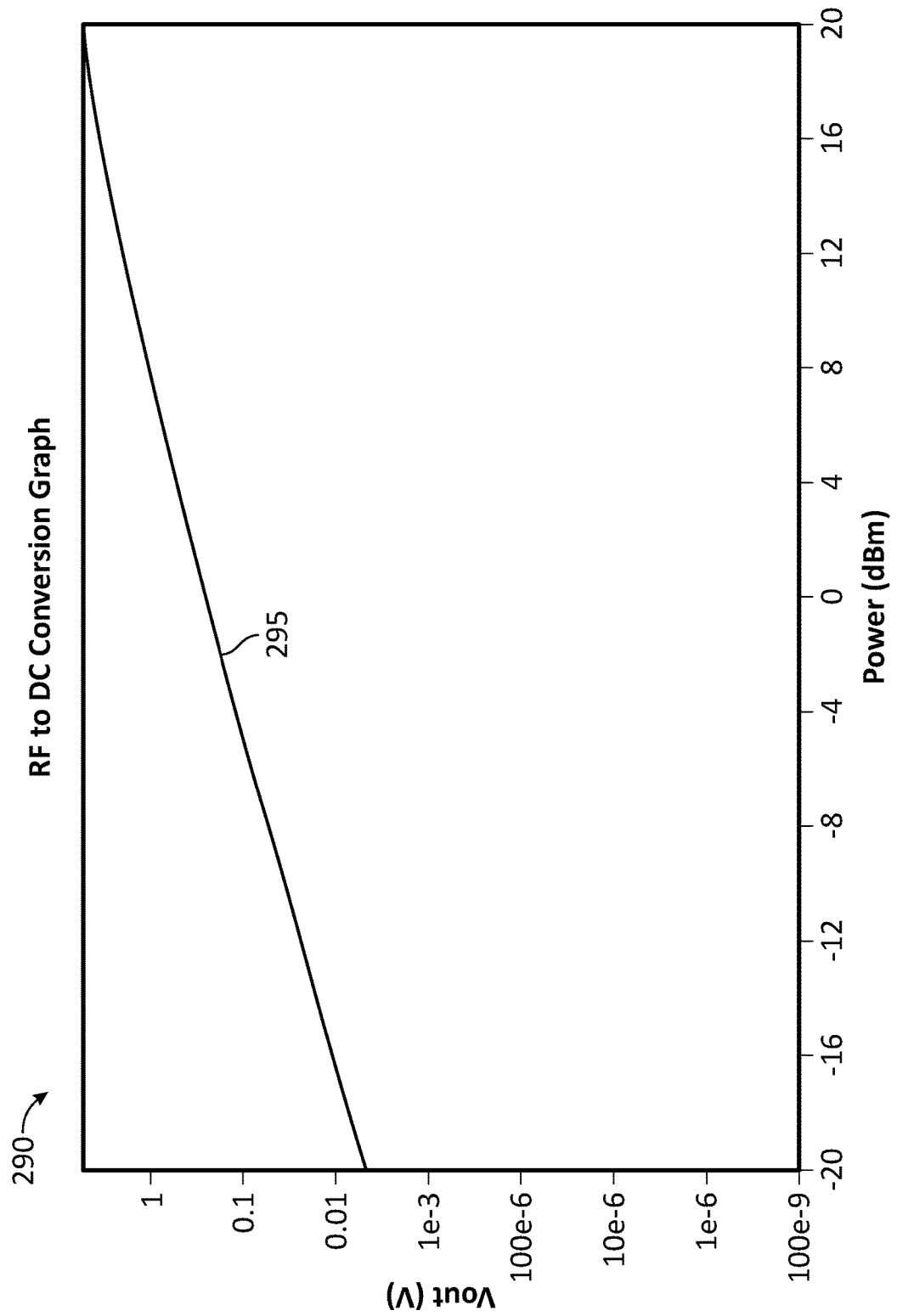
FIG. 2D is a chart illustrating voltage conversion versus input power in a second RF to DC conversion circuit, according to some embodiments.

FIG. 2D is a chart 290 illustrating voltage conversion versus input power in an RF to DC conversion circuit (e.g., RF to DC conversion circuits 225a and 225b), according to some embodiments. The abscissae (X-axis) in chart 280 represent the directed power (in dBm) at a given RF, and the ordinates (Y-axis) represent the output DC voltage (Volts). Curve 295 illustrates different voltage conversion efficiencies according to specific settings in the RF to DC conversion circuit. Curve 295 demonstrates efficient and fairly uniform RF power conversion over a broad range of dBm input levels, which translates into efficient near (e.g., higher input power) and far distance (e.g., lower input power) power transfer.

Figure 2E:
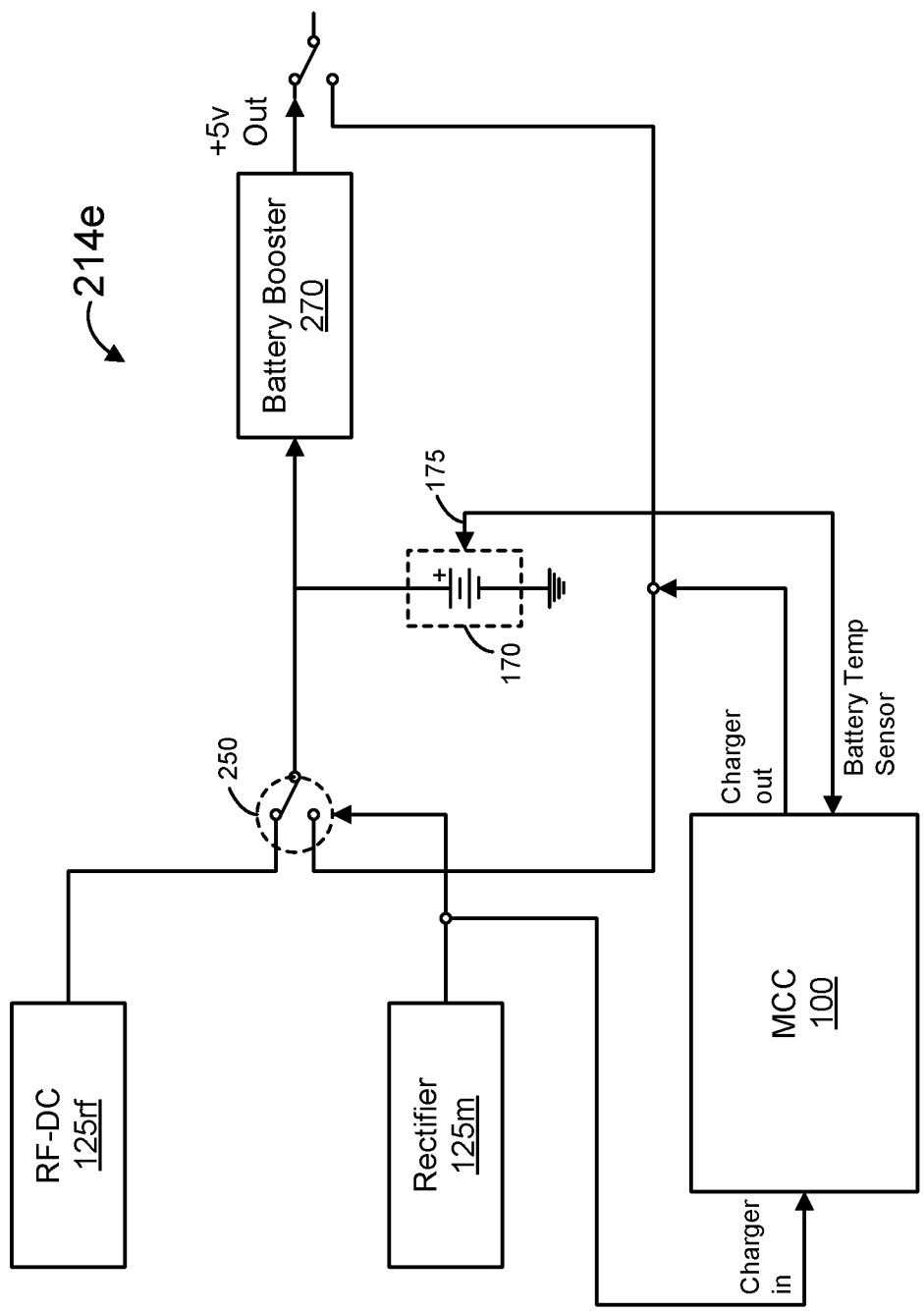
FIG. 2E is a block diagram of a receiver circuit in a PRU configured to receive power from a PTU, according to some embodiments.

FIG. 2E is a receiver block diagram in PRU 214e configured to receive power from PTU 12, according to some embodiments. RF to DC converter 125rf provides a DC voltage value conveying a directed RF power transferred by PTU 12. A rectifier 125m may include an RF modulated magnetic field to DC converter to produce a DC voltage value conveying a near field power transferred by PTU 12. Switch 250 toggles between the directed RF power and the near field power, selecting either one to charge battery 170. Moreover, switch 250 may include a tunable combination of the directed RF power and the near field power according to an optimized relative ratio, determined by MCC 100. Accordingly, in some embodiments the switch 250 is controlled by MCC 100 which receives information from battery 170 such as current charge level, and a temperature provided by a battery temperature sensor 175. A battery booster 270 maybe further configured to enhance the DC output of PRU 214e.

Figure 2F:
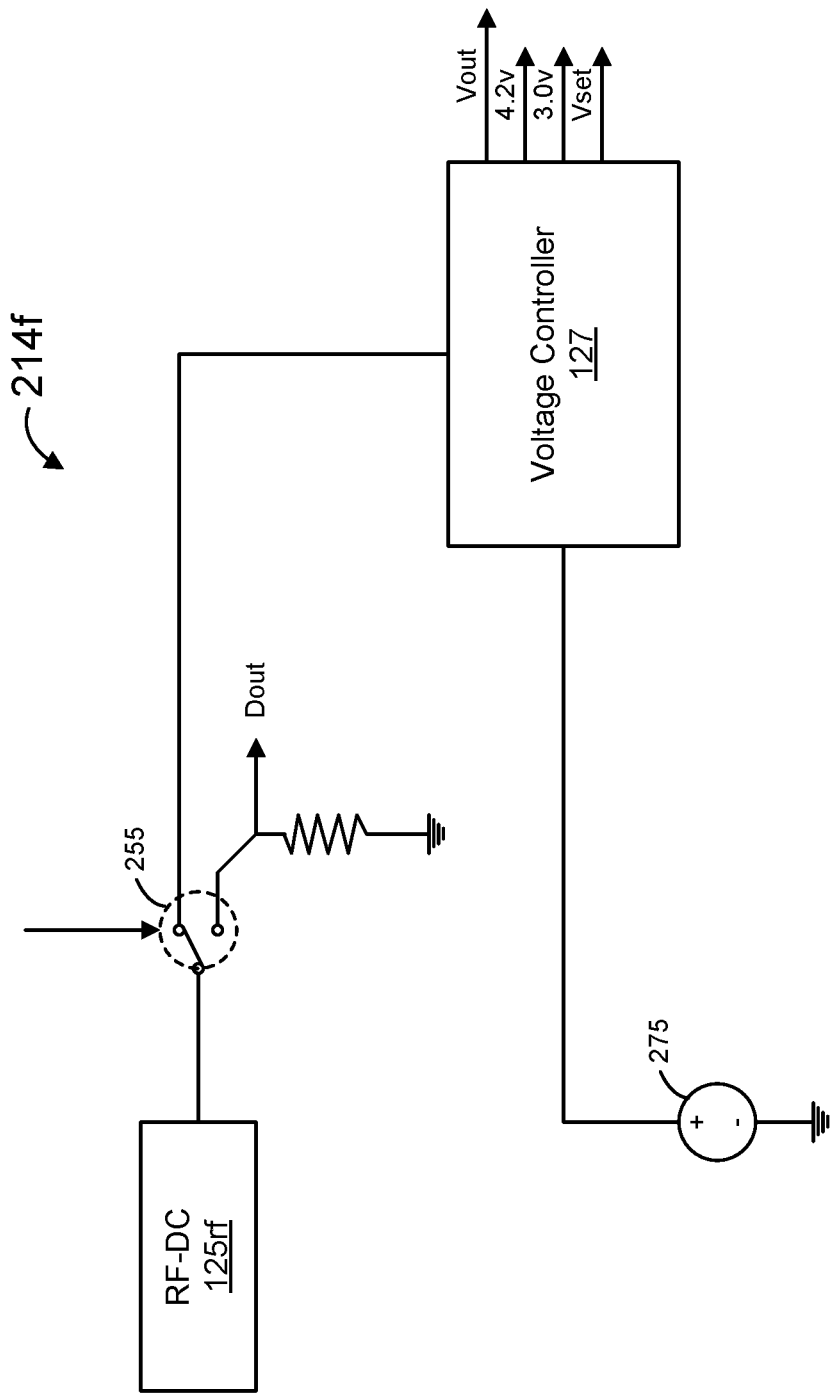
FIG. 2F is a block diagram of a receiver circuit in a PRU configured to receive power from a PTU including a voltage source, according to some embodiments.

FIG. 2F is a block diagram of PRU 214f configured to receive power from PTU 12, according to some embodiments. Switch 255 may be controlled by a processor circuit (e.g., MCC 100, not shown for clarity) to couple RF to DC converter 125rf to voltage controller 127 when the PRU is in a first mode of operation (e.g., a far field operation), or to couple RF to DC converter 125rf to ground in a second mode of operation (e.g., a near field operation). RF to DC converter 125rf provides a DC voltage value conveying a directed RF power transferred by PTU 12 to voltage control 127. In some embodiments, PRU 214f includes a voltage source 275 to provide a voltage reference input to voltage controller 127. Voltage controller 127 provides an output (Vout) that can take different values such as 4.2 V, 3 V, or a Vset value. In some embodiments, the Vset output is set with a resistor to a pre-selected value.

Figure 3:
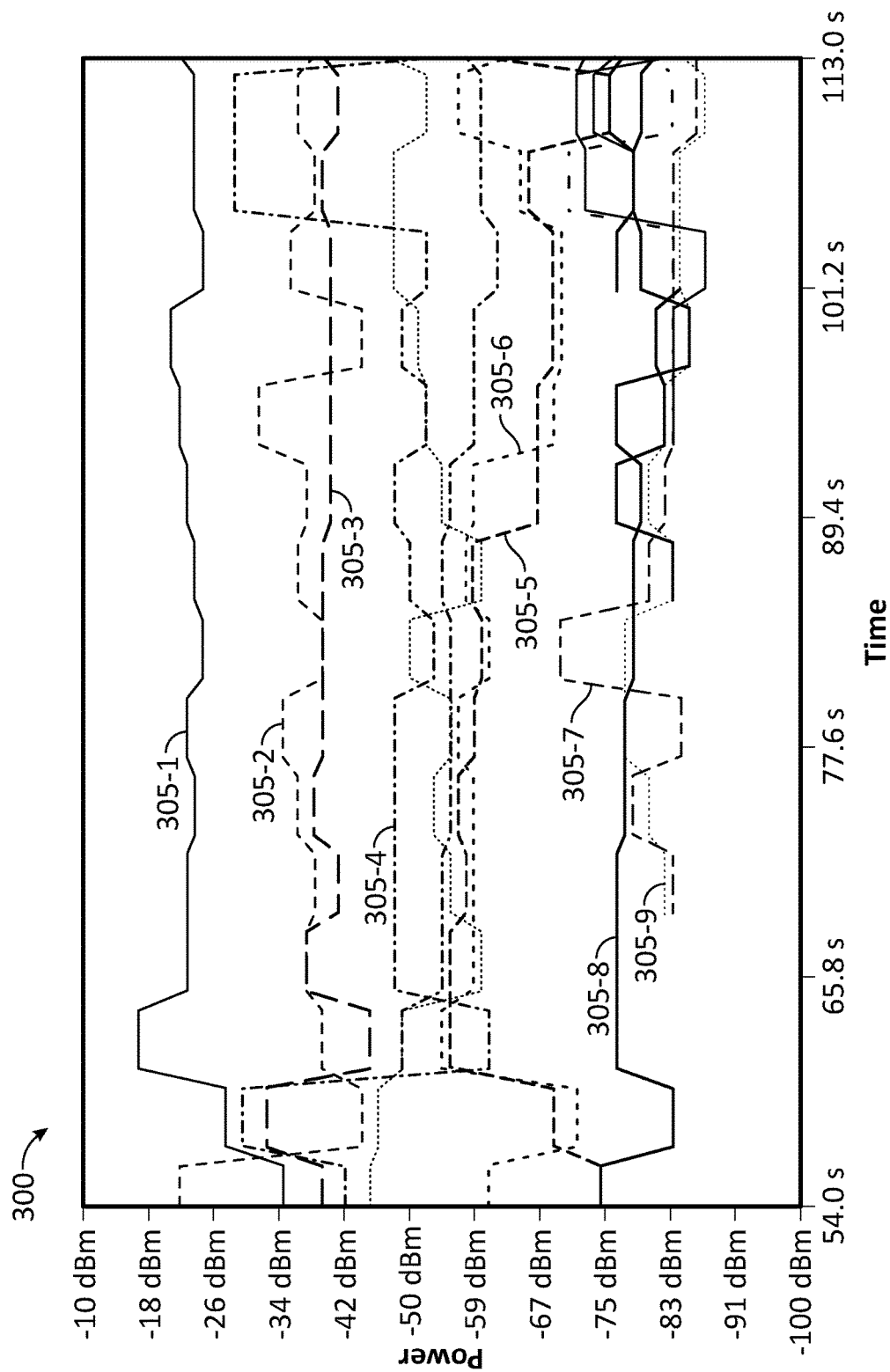
FIG. 3 is a chart illustrating signal strength for a plurality of WI-FI™ signals in a power harvesting configuration for a PRU, according to some embodiments.

FIG. 3 is a chart 300 illustrating signal strength for a plurality of wireless RF (e.g., WI-FI™) signals 305-1 through 305-9 (hereinafter, collectively referred to as "Wi-Fi signals 305") in a power harvesting configuration for a PRU, according to some embodiments. In chart 300, the abscissae (X-axis) include a time value (in secs), and the ordinates (Y-axis) indicate an RF power (dBm). Accordingly, in some embodiments a PRU may be configured to detect and tune the RF antenna (e.g., RF antenna 165) to one or more of the multiple Wi-Fi signals 305 and harvest the RF power by coupling an RF to DC converter circuit (e.g., RF to DC converter 125rf) with the RF antenna.

Figure 4A:
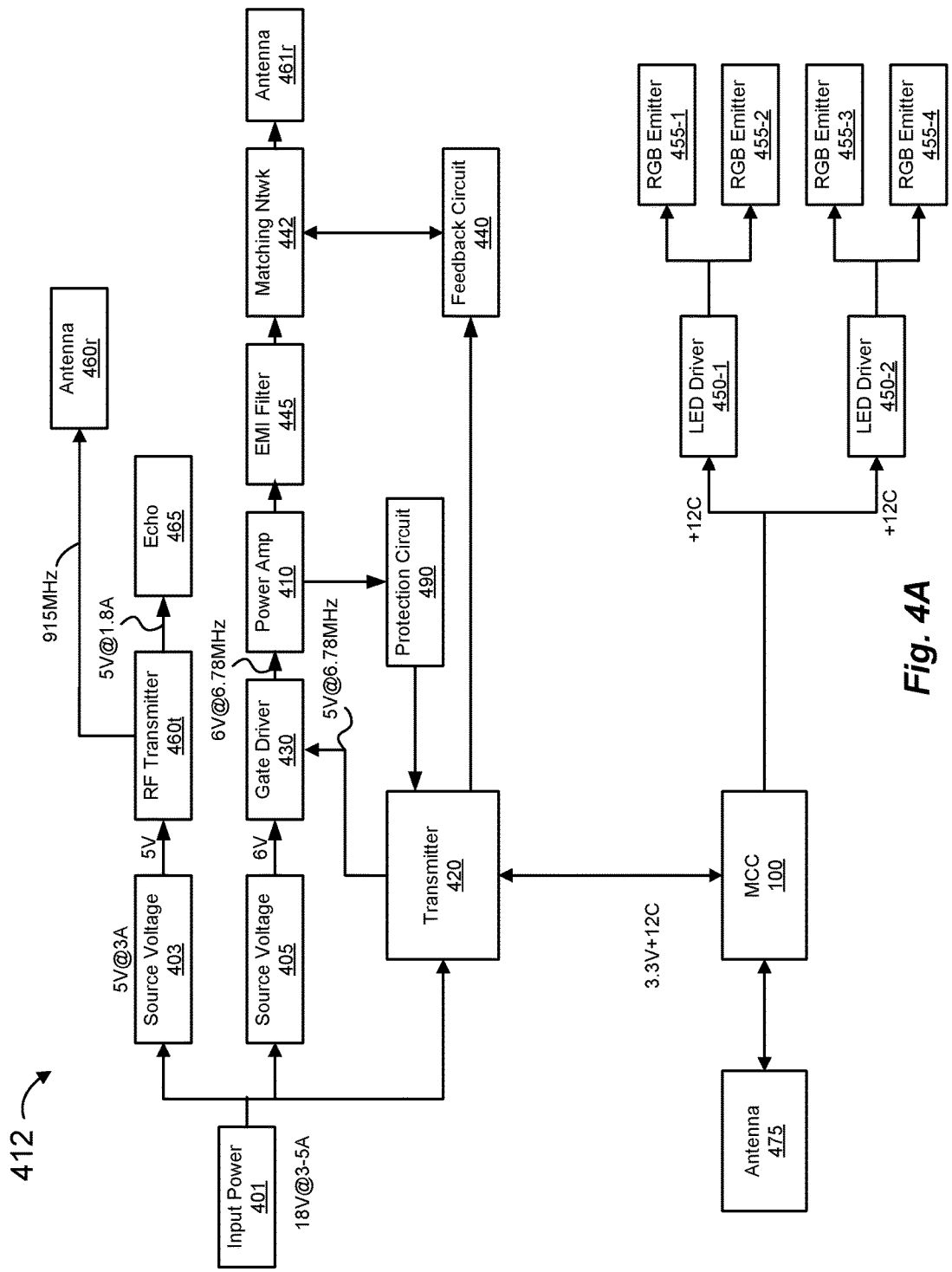
FIG. 4A is a block diagram illustrating a PTU, according to some embodiments.

FIG. 4A is a block diagram illustrating a PTU 412, according to some embodiments. Antenna 475. MCC 100 couples power signal (e.g., at 3.3V and +12 C) to a transmitter 420 (e.g., an application-specific IC, ASIC). MCC 100 provides a control signal to LED driver #1 450-1 and to LED driver #2 450-2 (hereinafter, collectively referred to as "LED drivers 450"). LED drivers 450 provide signals to turn on/off RGB emitters 455-1 through 455-4 (hereinafter, collectively referred to as "RGB emitters 455"). Accordingly, RGB emitters 455 light up when PTU 412 is ready for wirelessly transferring power to a mobile device (e.g., PRU 14, or PRU 214e,f).

In some embodiments, transmitter 420 transmits a power signal (e.g., at 5V and 6.78 MHz) to gate driver 430. A matching feedback circuit 440 provides adjustable tuning. A protection circuit 490 may include an over voltage protection (OVP) circuit, an over charge protection (OCP) circuit, or an over temperature protection (OTP) circuit. Protection circuit 490 also provides an indication of a local faults to transmitter 420. The local faults may include an excess voltage, excess charge, or excess temperature. Fault conditions as above may be desirably avoided when transmitter 420 operates in resonance. Accordingly, protection circuit 490 prevents damage to a power amplifier 410 from feedback if there is too much RF reflection from RF receiver 460r. In some embodiments, OVP circuit prevents overcoupling and damage to a device and system components in a resonant magnetic environment (e.g., at 6.78 MHz, or lower frequencies).

An input power 401 may be used to provide a power signal (e.g., at 18V and 3-5 A) to a source voltage block 403 (e.g., AUX VDD), which sends a power signal (e.g., at 5V) to RF transmitter 460t, to be transferred to the PRU through Rx antenna 460r (e.g., at 915 MHz). RF transmitter 460t couples a power signal from source voltage block 403 (e.g., at 5V and 1.8 A) to Echo dot 465.

A source voltage source 405 (VDD) provides a power signal (e.g., at 6V and 2 A) to gate driver 430. Power amplifier 410 amplifies the RF signal from gate driver 430. The amplified RF signal is passed through an electromagnetic interference (EMI) filter 445 to remove spurious frequency components. Matching network 442 directs the amplified and filtered RF signal to a specific network or network device located within range of PTU 412. RF antenna 461r transmits the directed RF power signal to the device in the matching network.

Figure 4B:
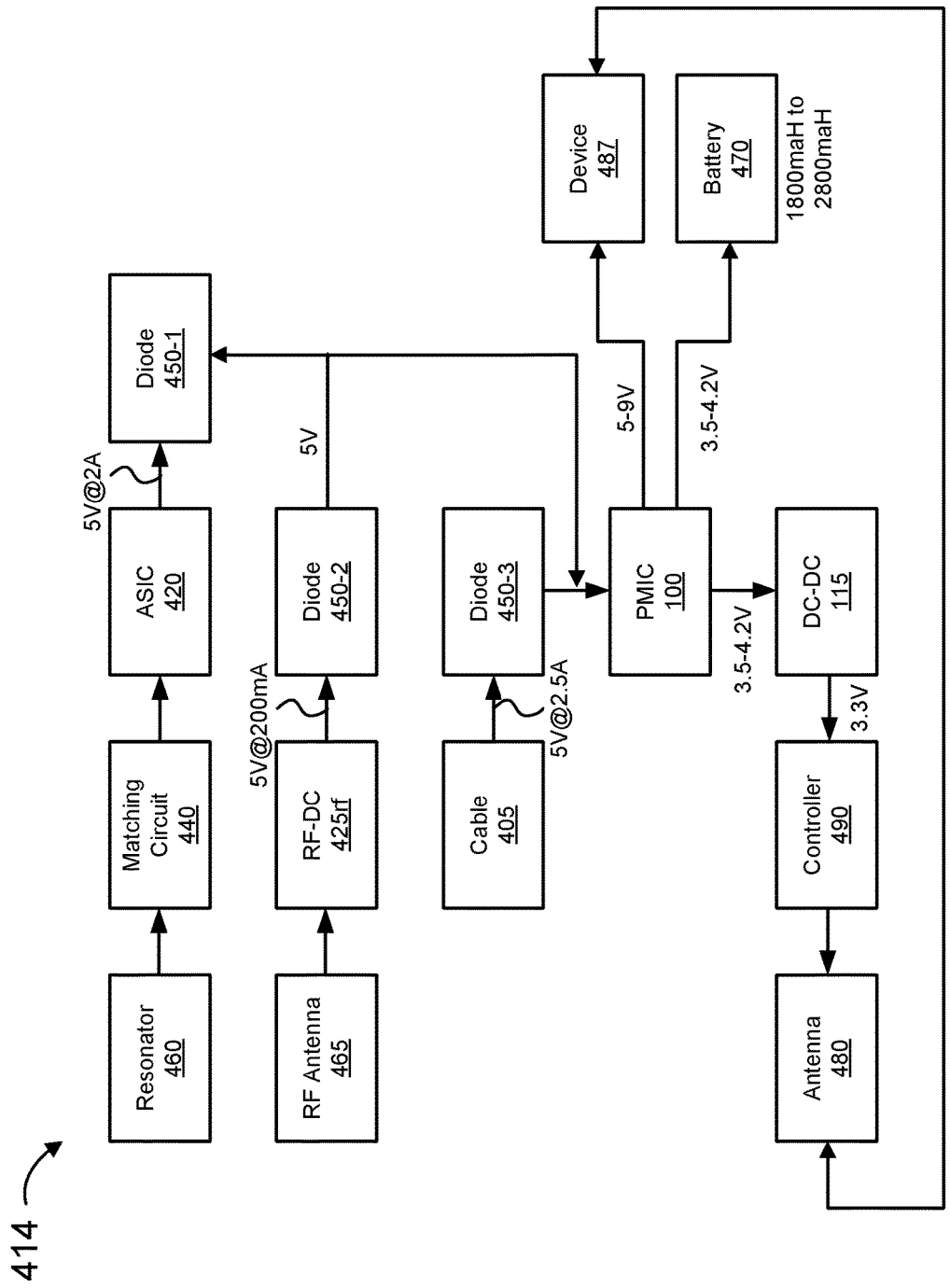
FIG. 4B is a block diagram illustrating a PRU including a reserve battery, according to some embodiments.

FIG. 4B is a block diagram illustrating a PRU 414 including a reserve battery 470, according to some embodiments. A wireless antenna 480 is activated by controller 490 and provides a signal to a PTU (e.g., PTU 12, or 412). In some embodiments, wireless antenna 480 is a BlueTooth antenna. For example, the signal provided by wireless antenna 480 to the PTU may indicate a power requirement for reserve battery 470, or a range configuration between the PTU and PRU 414. DC to DC converter 115 amplifies a control signal for wireless antenna 480 to controller 490. The control signal for wireless antenna 480 may be provided by a power management IC (PMIC, e.g., MCC 100). PMIC 100 provides a 5-9V power signal to mobile device 487, and a 3.5-4.2V power signal to reserve battery 470. Mobile device 487 may also couple with wireless antenna 480 through a bluetooth connection. Accordingly, mobile device 487 may be an external device docked onto PRU 414 by a user, for re-charging (e.g., device 187).

To receive the transferred power form the PTU, PRU 414 includes a resonator 460 that couples with matching circuit 440. Matching circuit 440 may tune resonator 460 to a particular RF frequency of an inductively coupled near field power signal provided by the PTU (e.g., an RF resonant magnetic field). The inductively coupled near field power signal is provided to ASIC 420 and to a diode 450-1 (e.g., at 5V and 2 A). RF antenna 465 is configured to receive an RF directed power transferred by the PTU, and is coupled with RF to DC circuit 425rf which provides a DC power signal (e.g., at 5 C and 200 mA) to an ideal diode 450-2. In some embodiments, a device cable 405 provides direct power to ideal diode 450-3 (e.g., at 5V and 2.5 A). Ideal diodes 450-1 through 450-3 will be collectively referred to, hereinafter, as "diodes 450" (e.g., diodes 235). The configuration of diodes 450 in PRU 414 enables PMIC 100 to receive power signals from three different sources: inductively coupled near field power signal, RF directed power signal (both from the PTU), and from an external source through device cable 405.

Figure 5:
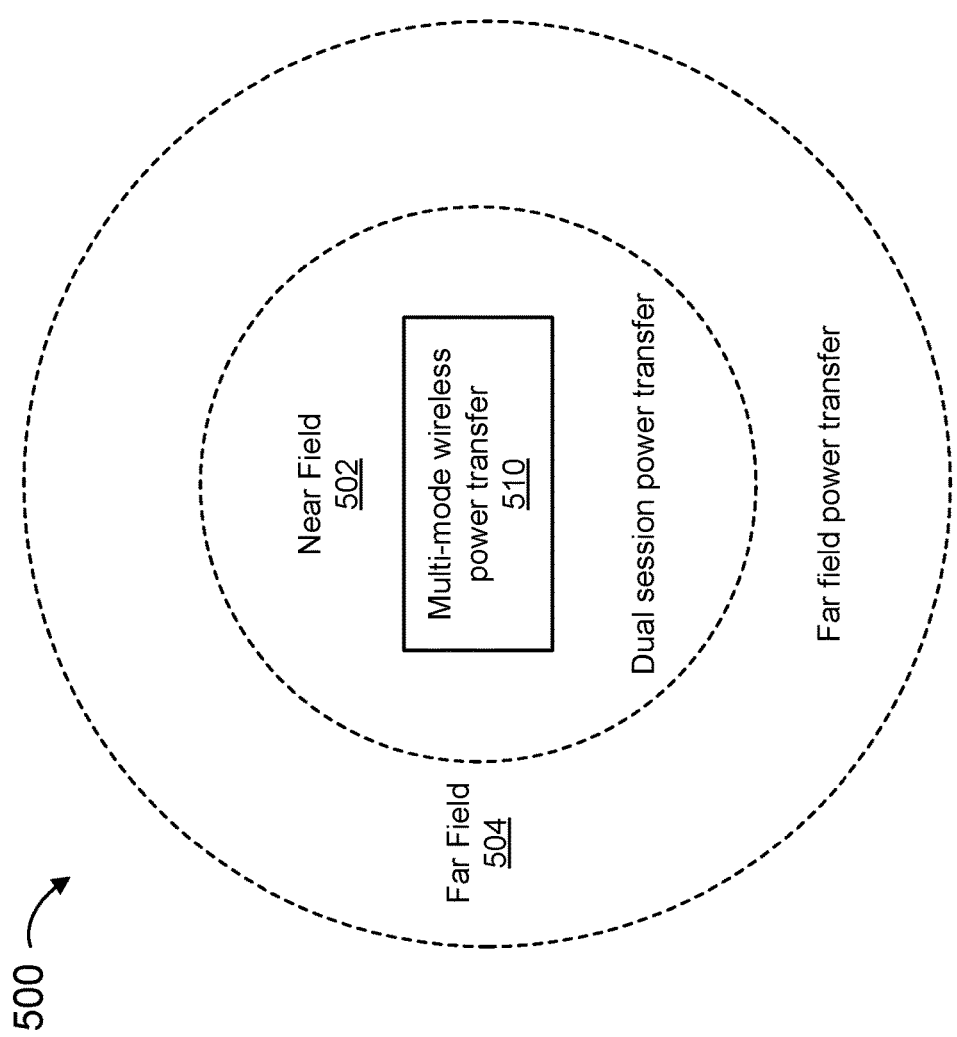
FIG. 5 is an illustration of a power range diagram illustrating different range configurations between a PTU and a PRU, according to some embodiments.

FIG. 5 illustrates a dual session power range diagram 500 illustrating different range configurations between a PTU and a PRU as disclosed herein. Efficient power transfer desirably occurs when the PRU is in close proximity to the PTU, such as in a near field range 502. In this way, the PRU is able to receive power from both a far field transmitter and a source resonator simultaneously, thus providing higher combined power when applicable. A less efficient power transfer occurs when the PRU is farther than near field range 502 from the PTU, but closer than a maximum effective far field range 504. In this range configuration, the PRU may receive power transferred from the far field source transmitter and may not receive it from the near field resonator in the PTU (e.g., inductively coupled, RF modulated magnetic field).

Figure 6:
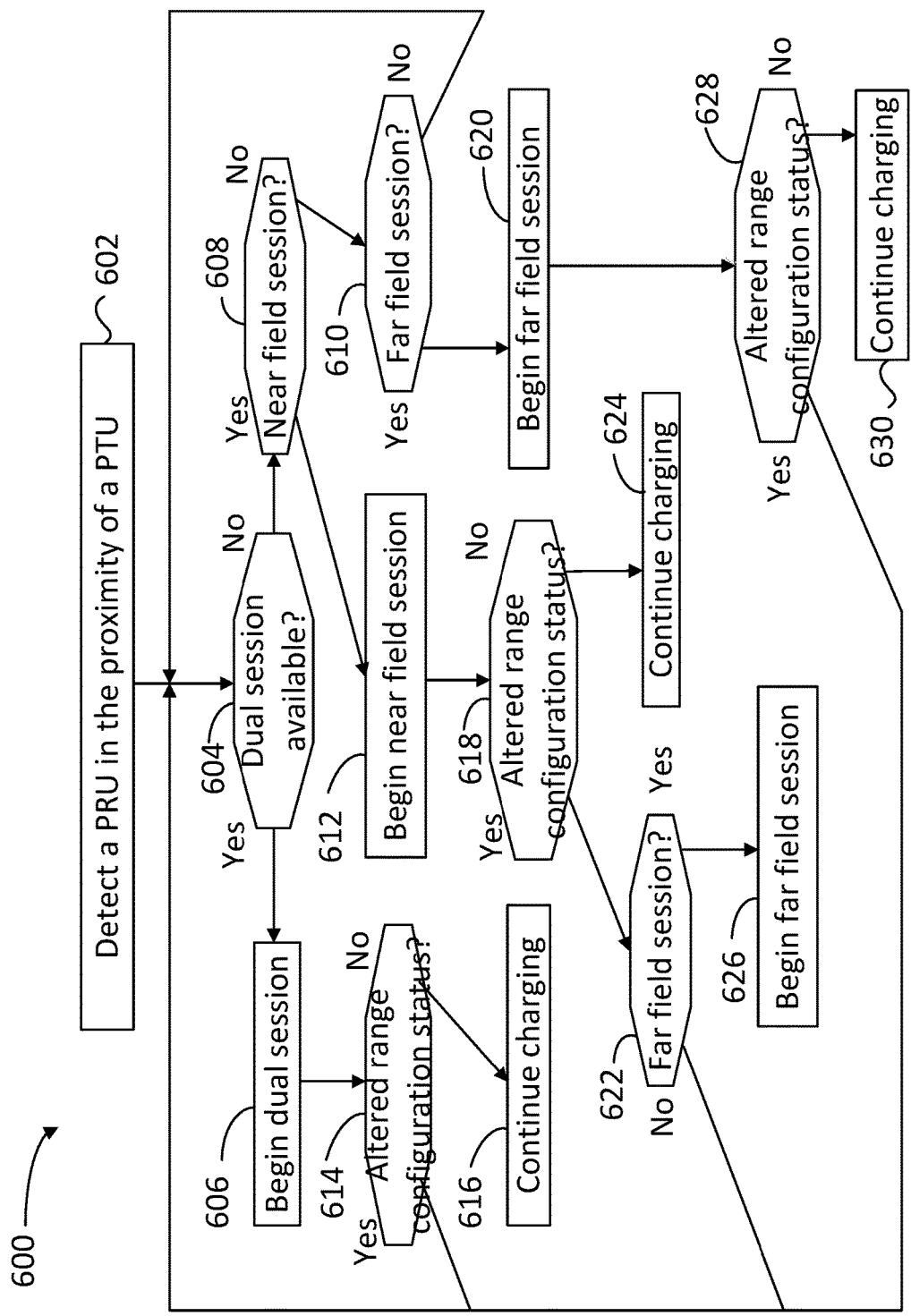
FIG. 6 is a flowchart illustrating steps in a method for intelligent power transfer management via a micro-controller circuit (MCC) based on optimized mode requirements, according to some embodiments.

FIG. 6 a illustrates a flow chart of a method 600 for intelligent power transfer between a PTU and a PRU, based on optimized mode requirements (e.g., PTU 12 and PRU 14). The PRU provides the transferred power to charge or re-charge a battery (e.g., battery 170). Method 600 may be performed at least partially by any one of MCC circuits installed in the PTU or the PRU device, (e.g., MCC 29, MCC 36, and MCC 100), while communicating with each other through a communications circuit (e.g., communications circuit 32). In some embodiments, method 600 is partially performed by a PTU in communication with one or more PRU's roaming in the proximity of the PTU. Each of the one or more PRU's may be handled by a user having access authorization to a power charging service of the PTU. At least some of the steps in method 600 may be performed by a processor executing commands stored in a memory (e.g., MCC 29, MCC 36, and MCC 100 and memory 155). Methods consistent with the present disclosure may include at least some, but not all of the steps illustrated in method 600, performed in a different sequence. Furthermore, methods consistent with the present disclosure may include at least two or more steps as in method 600 performed overlapping in time, or almost simultaneously.

Step 602 includes detecting the PRU in the proximity of the PTU. In some embodiments, step 602 includes detecting the PRU using a wireless antenna and a wireless communication protocol including a device-to-device handshake and identification protocol.

Step 604 includes determining, based on the proximity of the PTU, whether a dual session is available for power transfer between the PTU and the PRU. In some embodiments, step 606 includes checking, with the MCC in the PTU, or the MCC in the PRU, for the requirements of a dual session in order to provide a device load with as much power as efficiently possible for charging and powering of the device load.

In some embodiments, step 604 may include detecting an altered range between the PTU and the PRU. For example, an altered range may include the PRU moving into a range from the PTU where a dual session is no longer available. When an altered range is detected in step 604 then a dual session may not be available. When step 604 determines that a dual session is available and appropriate, step 606 includes beginning the dual session and power will be transferred from both near and far field sources in the PTU, to the PRU. In some embodiments, power transfer between the PTU and the PRU may be sustained until the PRU initiates the termination of power transfer (e.g., the battery is fully charged). When power is received by the PRU in the dual session of step 606, step 614 includes determining whether or not there is an altered range configuration status between PTU and PRU. In some embodiments, step 614 includes testing for a near-field check and far field check between the PTU and the PRU. If both checks fail, the system returns to step 604 to search for the availability of a dual session. If step 614 determines the absence of an altered range configurations, then step 616 includes continue charging the PRU. In some embodiments, step 616 includes continuing the power transfer from the PTU to the PRU until the PRU initiates the termination of power transfer.

When step 604 determines that a dual session is unavailable, then step 608 includes searching for a near field session. When a near field session is detected, step 612 includes beginning the near field session. Accordingly, step 612 includes transferring power in the near field from the PTU to the PRU (e.g., through magnetic induction). Step 618 includes determining whether an altered range configuration status has occurred. When no altered range configuration status has occurred, step 624 includes continue charging the battery in the near field session. When step 618 determines that an altered range configuration status has occurred, step 622 includes determining whether the PTU and the PRU are in a far field configuration. When step 622 confirms that a far field session is available, step 626 includes beginning the far field session for power transfer between the PTU and the PRU. When step 622 determines that no far field session is available between the PTU and the PRU, method 600 is repeated from step 604.

When step 604 determines that no dual session is available, and step 608 determines that no near field session is available, step 610 includes searching a far field session. If a far field session is detected in step 610 then step 620 includes beginning a far field session. Further, step 628 detects an altered range configuration status. When an altered range configuration status is present according to step 628, method 600 starts again from step 604. When an altered range configuration is not present according to step 628, then step 630 includes continuing the power transfer from the PTU to the PRU. In some embodiments, step 630 includes transferring power until the PRU initiates a termination of power transfer.

Figure 7:
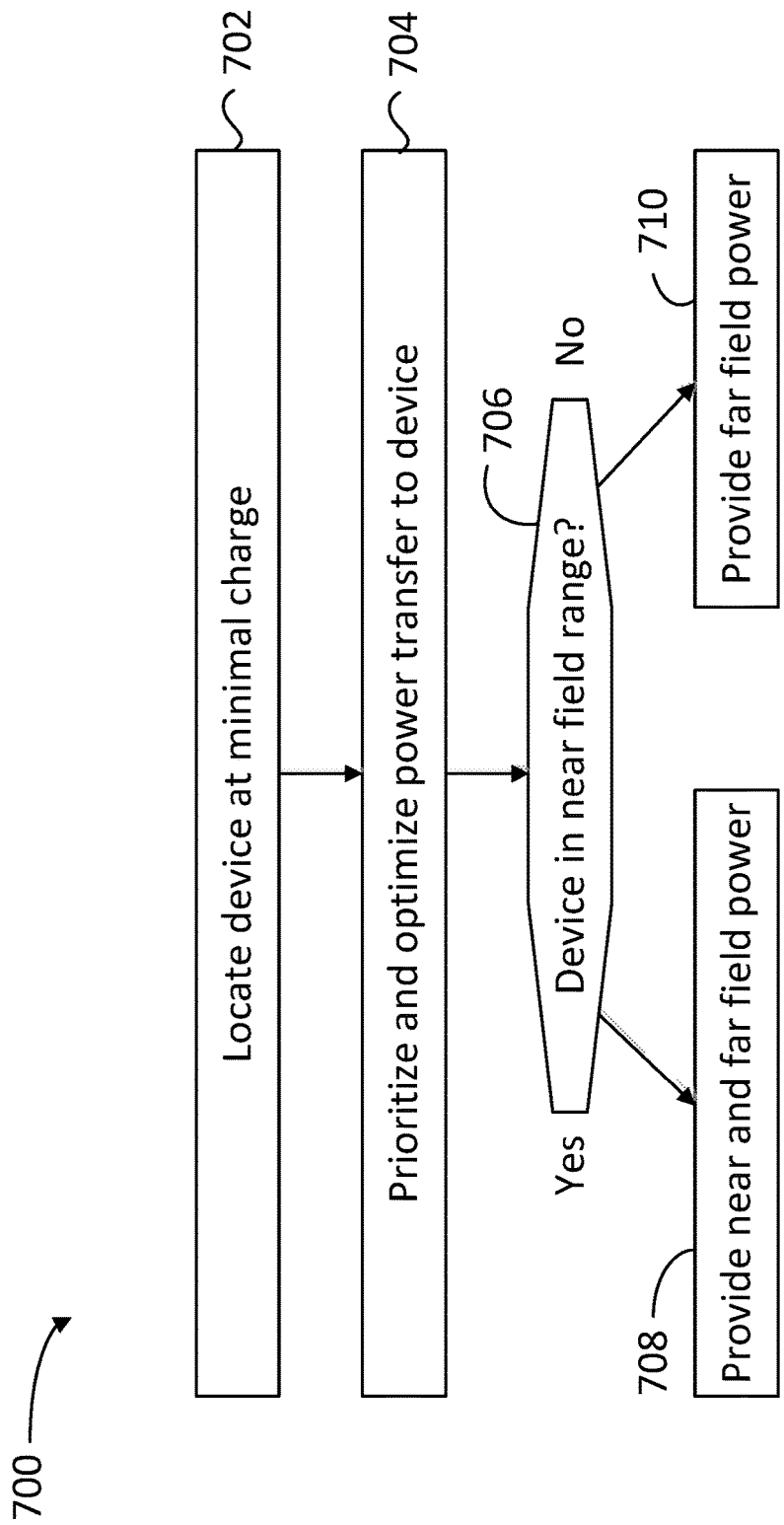
FIG. 7 is a flowchart illustrating steps in a method for intelligent power transfer management via the MCC based on power priority, according to some embodiments.

FIG. 7 illustrates a flow chart of a method 700 for intelligent power transfer management via either the MCC in the PTU or the MCC in the PRU where applicable, based on power priority. The PRU provides the transferred power to charge or re-charge a battery (e.g., battery 170). Method 700 may be performed at least partially by any one of MCC circuits installed in the PTU or the PRU device, (e.g., MCC 29, MCC 36, and MCC 100), while communicating with each other through a communications circuit (e.g., communications circuits 32, 38, 132 and 138). In some embodiments, method 700 is partially performed by a PTU in communication with one or more PRU's roaming in the proximity of the PTU. Each of the one or more PRU's may be handled by a user having access authorization to a power charging service of the PTU. At least some of the steps in method 700 may be performed by a processor executing commands stored in a memory (e.g., MCC 29, MCC 36, and MCC 100 and memory 155). Methods consistent with the present disclosure may include at least some, but not all of the steps illustrated in method 700, performed in a different sequence. Furthermore, methods consistent with the present disclosure may include at least two or more steps as in method 700 performed overlapping in time, or almost simultaneously.

Step 702 includes locating a device having a minimal charge. Accordingly, step 702 may include prioritizing a power transfer to a PRU when a device load is in a low power state. Further, in some embodiments step 704 includes providing a near field and far field dual session to a PRU having a particularly low charge status. Step 706 includes determining whether the PRU is in a near field range. When step 706 determines that the PRU is not in a near field range, then a dual session is unavailable, and step 706 includes determining whether the PRU in a far field range of the PTU. When step 706 determines that the PRU is in a far field range of the PTU, step 710 includes transferring power to the PRU in a far field configuration. When step 706 determines that the PRU is in a near field range, step 708 may include providing a near field and a far field power transfer configuration.

Thus, in an embodiment the method of managing multi-mode transfer of wireless power, includes intelligently optimizing the wireless transfer of power from a multi-mode PTU, and capturing and receiving the optimized power transferred wirelessly over varying distances by one or more PRU's. The PTU includes a wireless communication protocol capable of independently identifying each PRU, engaging one or more identified PRU's, and sensing the range of each engaged PRU relative to the PTU, thus generating identification and range data.

The PTU processes the identification and range data to intelligently determine which mode or modes simultaneously, shall be induced during the wireless power transfer session of each engaged power receiving unit in a manner that optimizes power transfer rate and efficiency. An engaged PRU, upon successfully establishing a communication link with the PTU via said communication protocol, and upon determining the presence of a corresponding software program installed on a device capable of running the software will provide relevant wireless power transfer session data in a visual format via the software program.

The PRU may be integrated into a variety of device selected from a group of electronic devices consisting of a computer, laptop computer, mobile phone, smart phone, tablet computer, and tablet phone wherein the device is capable of facilitating and running a software program for the purpose of displaying session data and offering additional command options for the power transfer session in a visual format.

Figure 8:
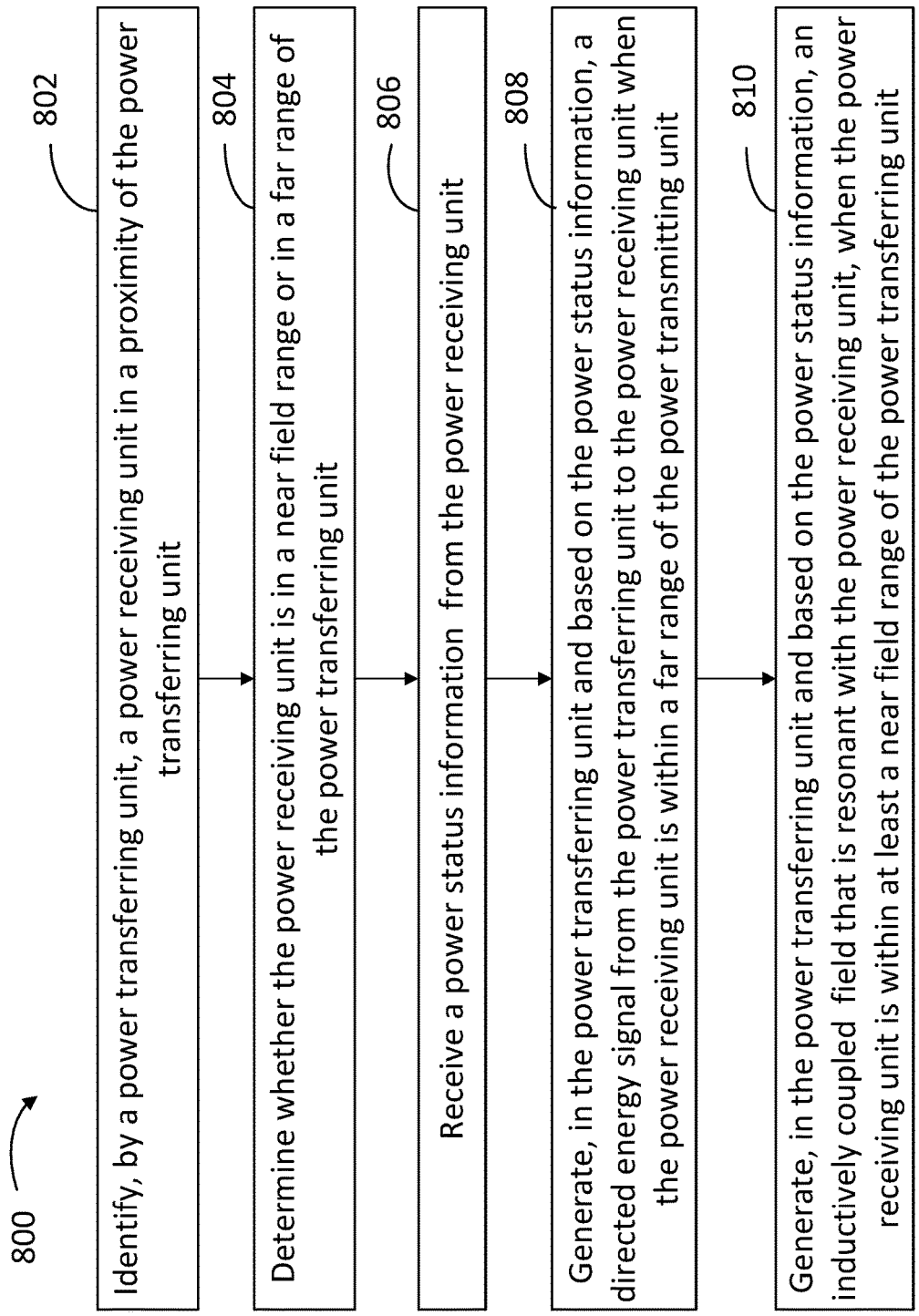
FIG. 8 is a flowchart illustrating steps in a method for managing, from a power transferring unit, a power transfer to a power receiving unit, according to some embodiments.

FIG. 8 is a flowchart illustrating steps in a method 800 for managing, from a power transferring unit, a power transfer to a power receiving unit, according to some embodiments. Method 800 may be performed at least partially by any one of MCC circuits installed in the PTU or the PRU device, and executing instructions stored in a memory (e.g., MCC 29, MCC 36, and MCC 100 and memory 155), while communicating with each other through a communications circuit (e.g., communications circuits 32, 38, 132, and 138). The PRU provides the transferred power to charge or re-charge a battery (e.g., battery 170). In some embodiments, method 800 is partially performed by a PTU in communication with one or more PRU's roaming in the proximity of the PTU. Each of the one or more PRU's may be handled by a user having access authorization to a power charging service of the PTU. Methods consistent with the present disclosure may include at least some, but not all of the steps illustrated in method 800, performed in a different sequence. Furthermore, methods consistent with the present disclosure may include at least two or more steps as in method 800 performed overlapping in time, or almost simultaneously.

Step 802 includes identifying, by the PTU, at least one PRU in a proximity of the PTU. In some embodiments, step 802 may include identifying multiple PRUs in the proximity of the PTU. In some embodiments, the PTU includes a wireless communication protocol capable of independently identifying each PRU, and step 802 includes engaging one or more identified PRU's within a power range of the PTU.

Step 804 includes determining whether the PRU is in a near field range or in a far range of the PTU. In some embodiments, step 804 includes generating identification and range data for each of the multiple PRUs within a detectable range of the PTU.

Step 806 includes receiving a power status information from the PRU. In some embodiments, step 806 may include receiving a power status information from the multiple PRUs in the proximity of the PTU. Further, in some embodiments step 806 includes prioritizing the power requirements of the multiple PRUs based on the power status information and other device characteristics. For example, some PRUs may have a low charge battery, but may also include a reserve battery that mitigates the need for immediate recharging, and therefore step 806 may include reducing the priority for power transfer of a PRU including a reserve battery relative to a PRU that does not include a reserve battery. In some embodiments, step 806 includes determining a priority for power transfer of at least one of the PRUs based on the determination of whether the PRU is in the near field range or in the far range of the PTU.

In some embodiments, the PTU processes the identification and range data of the one or more PRU's within the power range of the PTU to determine which mode or modes of operation may be used, even simultaneously, during the wireless power transfer session of each engaged power receiving unit in a manner that optimizes power transfer rate and efficiency.

Step 808 includes generating, in the PTU and based on the power status information, a directed power signal from the PTU to the PRU when the power receiving unit is in proximity of a far range of the PTU.

Step 810 includes generating, in the PTU and base on the power status information, an inductively coupled field that is resonant with the PRU, when the PRU is in the proximity of at least a near field range of the power transferring unit. In some embodiments, the inductively coupled field is an RF-modulated magnetic field, and step 810 includes selecting the RF modulation frequency in resonance with a receiver circuit in the PRU (e.g., Rx resonator 160*r*). Accordingly, step 810 may include transferring power from the PTU as needed by the PRU in at least one of a near field configuration or a far field configuration.

In some embodiments, step 810 includes verifying the status of the range configuration between the PTU and the PRU and updating the power transfer mode accordingly. For example, when the PRU transitions from the far field of the PTU to the near field of the PTU, the transfer mode may be adjusted from a far field mode only to a combination of a far field mode and a near field mode, or to a near field mode only configuration.

Figure 9:
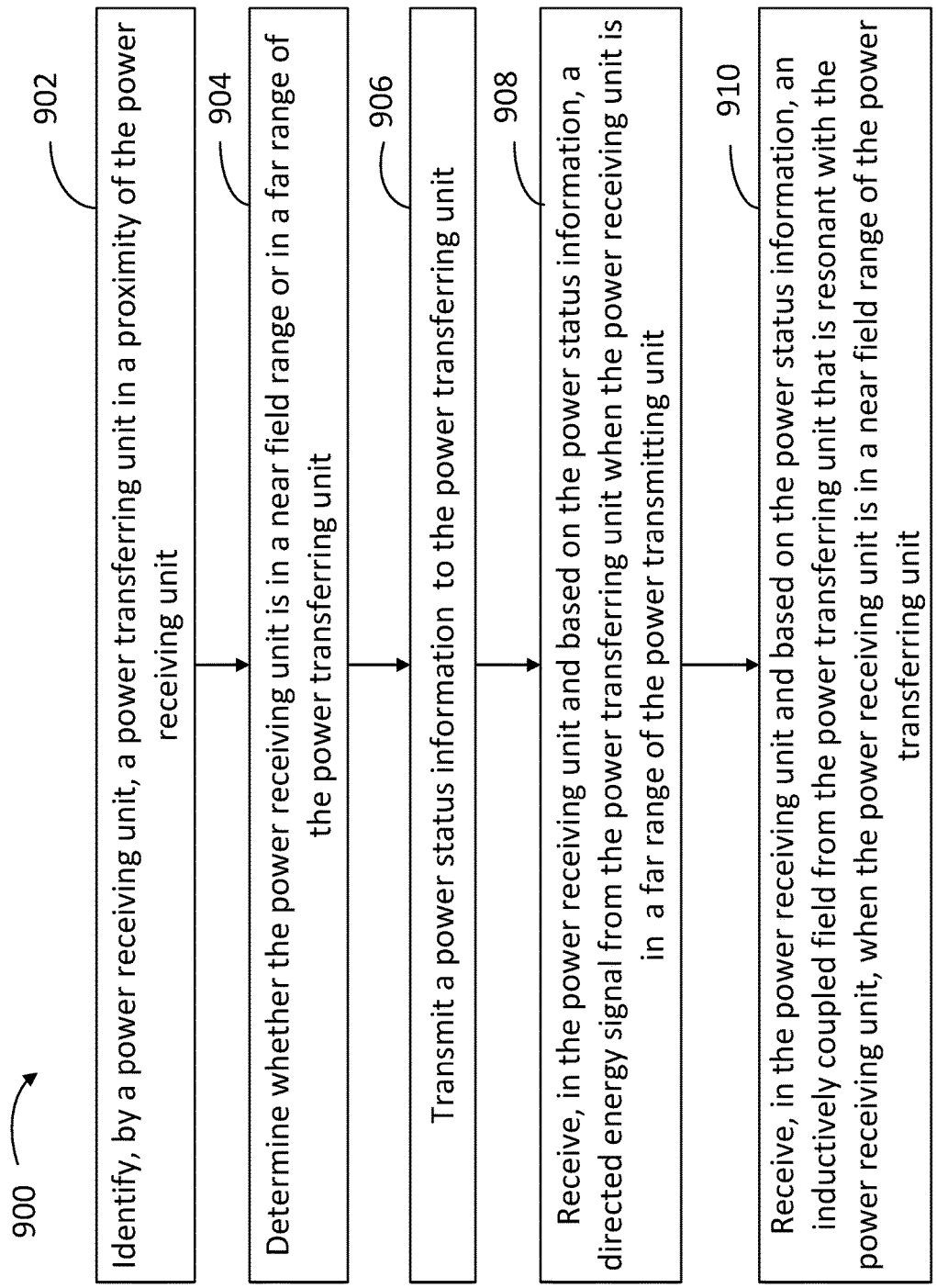
FIG. 9 is a flowchart illustrating steps in a method for managing, from a power receiving unit, a power transfer from a power transferring unit, according to some embodiments.

FIG. 9 is a flowchart illustrating steps in a method 900 for managing, from a power receiving unit, a power transfer from a power transferring unit, according to some embodiments. The PRU provides the transferred power to charge or re-charge a battery (e.g., battery 170). Method 900 may be performed at least partially by any one of MCC circuits installed in the PTU or the PRU device, executing instructions stored in a memory (e.g., MCC 29, MCC 36, and MCC 100 and memory 155), while communicating with each other through a communications circuit (e.g., communications circuit 32, 38, 132 and 138). In some embodiments, method 900 is partially performed by a PTU in communication with one or more PRU's roaming in the proximity of the PTU. Each of the one or more PRU's may be handled by a user having access authorization to a power charging service of the PTU. Methods consistent with the present disclosure may include at least some, but not all of the steps illustrated in method 900, performed in a different sequence. Furthermore, methods consistent with the present disclosure may include at least two or more steps as in method 900 performed overlapping in time, or almost simultaneously.

Step 902 includes identifying, by the PRU, a PTU in a proximity of the PRU.

Step 904 includes determining whether the PRU is in a near field range or in a far range of the PTU.

Step 906 includes transmitting a power status information to the power transferring unit.

Step 908 includes receiving, in the PRU and based on the power status information, a directed power signal from the PTU when the PRU is in proximity of a far range of the PTU.

Step 910 includes receiving, in the PRU and based on the power status information, an inductively coupled field from the PTU that is resonant with the PRU, when the PRU is in the proximity of at least a near field range of the power transferring unit. In some embodiments, the inductively coupled field is an RF-modulated magnetic field, and step 910 includes receiving the resonant RF-modulated magnetic field with a receiver circuit in the PRU (e.g., Rx resonator 160*r*).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), General Purpose Processors (GPPs), Microcontroller Units (MCUs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of some of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

As mentioned above, other embodiments and configurations may be devised without departing from the spirit of the disclosure and the scope of the appended claims.

The term "machine-readable storage medium" or "computer readable medium" as used herein refers to any medium or media that participates in providing instructions or data to processor for execution. Such a medium may take many forms, including, but not limited to, non-volatile media, volatile media, and transmission media. Non-volatile media include, for example, optical disks, magnetic disks, or flash memory (e.g., memory 155). Volatile media include dynamic memory (e.g., memory 155). Transmission media include coaxial cables, copper wire, and fiber optics, including the wires that include a bus. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some," refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A method, comprising:
receiving a signal in a power transferring unit over a first antenna coupled to a communications circuit in the power transferring unit, the communications circuit configured to establish communication between the power transferring unit and a power receiving unit, the signal indicating a range configuration between the power transferring unit and the power receiving unit;

determining whether the power receiving unit is in a near field range or in a far field range of the power transferring unit based on the range configuration; and transferring wireless power from the power transferring unit to the power receiving unit, wherein transferring wireless power comprises:

generating, in the power transferring unit, a directed energy radio frequency (RF) field on a second antenna from the power transferring unit to the power receiving unit when the signal has a first range configuration indicating the power receiving unit is within a far field range of the power transferring unit, wherein the far field range corresponds to a first distance between the power transferring unit and the power receiving unit;

generating, in the power transferring unit, a resonant inductive field on a source coil, the resonant inductive field being coupled with the power receiving unit, when the signal has a second range configuration indicating the power receiving unit is within at least a near field range of the power transferring unit, wherein the near field range corresponds to a second distance between the power transferring unit and the power receiving unit, wherein the first distance is greater than the second distance; and switching between the resonant inductive field and the directed energy radio frequency (RF) field when the power transferring unit receives a signal over the first antenna indicating an altered range configuration.

2. The method of claim 1, further comprising receiving a power status from the power receiving unit, said receiving a power status comprising receiving a charge level of a battery in the power receiving unit, a selected voltage level for charging the battery, and a selected current level for charging the battery.

3. The method of claim 1, further comprising simultaneously generating the directed energy radio frequency (RF) field and generating the resonant inductive field when the power receiving unit is within the near field range of the power transferring unit.

4. The method of claim 1, further comprising stopping the resonant inductive field when the power receiving unit is farther from the power transferring unit than the near field range.

5. The method of claim 1, further comprising stopping the directed energy radio frequency (RF) field when the power receiving unit is farther from the power transferring unit than the far field range.

6. The method of claim 1, further comprising identifying a power receiving unit in a proximity of the power transferring unit, said identifying comprising identifying multiple power receiving units in the proximity of the power transferring unit, and prioritizing at least one of the power receiving units according to a power status for generating the directed energy radio frequency (RF) field or for generating the resonant inductive field.

7. The method of claim 1, further comprising stopping the directed energy radio frequency (RF) field or stopping the resonant inductive field when receiving a power transfer termination message from the power receiving unit.

8. The method of claim 1, further comprising generating the directed energy radio frequency (RF) field for a first power receiving unit and generating the resonant inductive field for a second power receiving unit.

9. A power receiving unit, comprising:
a communication circuit coupled to a first antenna;
a direct energy radio frequency (RF) unit coupled to a second antenna;
a resonant inductive unit coupled to a capture coil;
a memory configured to store instructions; and
a processor, configured to execute the instructions to cause the power receiving unit to perform steps to:

determine whether the power receiving unit is in a near field range or in a far field range of a power transferring unit;

send a signal to the power transferring unit over the first antenna coupled to the communications circuit, the communications circuit configured to establish communication between the power transferring unit and the power receiving unit, the signal indicating a range configuration between the power transferring unit and the power receiving unit; and transfer wireless power from the power transferring unit to the power receiving unit, wherein transfer wireless power comprises:

receiving a directed energy radio frequency (RF) field on a second antenna from the power transferring unit when the signal has a first range configuration indicating the power receiving unit is within a far field range of the power transferring unit, wherein the far field range corresponds to a first distance between the power transferring unit and the power receiving unit;

receiving a resonant inductive field on the capture coil, that is resonant the resonant inductive field being coupled with the power transferring unit, when the signal has a second range configuration indicating the power receiving unit is within at least a near field range of the power transferring unit, wherein the near field range corresponds to a second distance between the power transferring unit and the power receiving unit, wherein the first distance is greater than the second distance; and switching between the resonant inductive field and the directed energy radio frequency (RF) field when the power receiving unit detects a transition from the near field range to the far field range and sends said signal over the first antenna indicating an altered range configuration.

10. The power receiving unit of claim 9, further comprising a passively tuned integrated circuit configured to tune the second antenna to receive the directed energy radio frequency (RF) field from the power transferring unit.

11. The power receiving unit of claim 9, further comprising a passively tuned integrated circuit to tune the capture coil in resonance with the resonant inductive field.

12. The power receiving unit of claim 9, further comprising a radio-frequency to direct current converter and a direct-current to direct-current converter to provide power from the directed energy radio frequency (RF) field to a battery.

13. The power receiving unit of claim 9, further comprising a circuit configured to convert the directed energy radio frequency (RF) field and the resonant inductive field to a direct current signal to charge a battery in the power receiving unit.

14. The power receiving unit of claim 9, further comprising a power management circuit configured to receive a first power from the directed energy radio frequency (RF) field and a second power from the resonant inductive field, and to determine a total power provided to a battery in the power receiving unit based on the first power and the second power.

15. The power receiving unit of claim 9, further comprising a first circuit to convert the directed energy radio frequency (RF) field to a first direct current power, and a second circuit to convert the resonant inductive field into a second direct current power, wherein the first direct current power and the second direct current power are provided to charge a battery in the power receiving unit.

16. A method, comprising:
    determining whether a power receiving unit is in a near field range or in a far field range of a power transferring unit;
    sending a signal to the power transferring unit over a first antenna coupled to the communications circuit, the communications circuit configured to establish communication between the power transferring unit and the power receiving unit, the signal indicating a range configuration between the power transferring unit and the power receiving unit; and
    receiving wireless power from the power transferring unit in the power receiving unit,
    wherein receiving wireless power comprises:
        receiving, in the power receiving unit, a directed energy radio frequency (RF) field on a second antenna signal from the power transferring unit to the power receiving unit when the signal has a first range configuration indicating the power receiving unit is within a far field range of the power transferring unit, wherein the far field range corresponds to a first distance between the power transferring unit and the power receiving unit;
        receiving, in the power receiving unit, a resonant inductive field on a capture coil, the resonant inductive field being coupled with the power transferring unit, when the signal has a second range configuration indicating the power receiving unit is within at least a near field range of the power transferring unit wherein the near field range corresponds to a second distance between the power transferring unit and the power receiving unit, wherein the first distance is greater than the second distance; and
        switching between the resonant inductive field and the directed energy radio frequency (RF) field when the power receiving unit detects a transition from the near field range to the far field range and sends said signal over the first antenna indicating an altered range configuration.

17. The method of claim 16, further comprising transmitting a power status to the power transferring unit, said transmitting a power status comprising transmitting a charge level of a battery in the power receiving unit, a selected voltage level for charging the battery, and a selected current level for charging the battery.

18. The method of claim 16, further comprising transmitting a power transfer termination message to the power transferring unit when a battery is fully charged in the power receiving unit.

19. The method of claim 16, further comprising identifying a wireless communication signal and converting the wireless communication signal to a direct current power signal to charge a battery in the power receiving unit.

* * * * *